United States Patent [19]
Noda et al.

[11] Patent Number: 5,870,142
[45] Date of Patent: Feb. 9, 1999

[54] IMAGE SENSOR, IMAGE READING DEVICE, AND IMAGE READING METHOD

[75] Inventors: Satoshi Noda; Yoshiya Imoto; Hirokazu Ichikawa, all of Ebina, Japan

[73] Assignee: Fuji Xerox Co., Ltd., Tokyo, Japan

[21] Appl. No.: 634,671

[22] Filed: Apr. 18, 1996

[30] Foreign Application Priority Data

Apr. 21, 1995 [JP] Japan ..................................... 7-096817

[51] Int. Cl.⁶ ............................ H04N 3/14; H04N 5/335; H04N 9/07
[52] U.S. Cl. ............................ 348/266; 348/318; 348/324
[58] Field of Search ..................................... 348/317, 318, 348/319, 320, 321, 266, 272, 324

[56] References Cited

U.S. PATENT DOCUMENTS

| | | | |
|---|---|---|---|
| 4,336,556 | 6/1982 | Sekine et al. | 348/319 |
| 4,744,057 | 5/1988 | Descure et al. | 365/183 |
| 4,761,683 | 8/1988 | Matterson et al. | 358/75 |
| 4,866,512 | 9/1989 | Hirosawa et al. | 358/75 |
| 5,440,343 | 8/1995 | Parulski et al. | 348/316 |

FOREIGN PATENT DOCUMENTS

| | | |
|---|---|---|
| A-63-191467 | 8/1988 | Japan . |
| B2-6-20221 | 3/1994 | Japan . |
| B2-6-65230 | 8/1994 | Japan . |
| B2-6-81225 | 10/1994 | Japan . |

*Primary Examiner*—Andrew I. Faile
*Assistant Examiner*—Alicia M. Harrington
*Attorney, Agent, or Firm*—Oliff & Berridge, PLC

[57] ABSTRACT

An image sensor includes a plurality of photosensitive pixel lines adjacent to each other in the sub-scanning direction, each of the photosensitive pixel lines having a number of photosensitive pixels arranged in the main scanning direction, and horizontal transfer registers disposed outside of the photosensitive pixel lines. A storage part for saving therein signal charges on a pixel-by-pixel basis is interposed between the photosensitive pixel lines and the horizontal transfer registers. Transfer of signal charges between the photosensitive pixel lines, storage part, and horizontal transfer registers are controlled by operating shift gates so that at a time point when exposure of the inside photosensitive pixel line has been finished, signal charges of the outside photosensitive pixel line is saved into the storage part to thereby secure a transfer passage for signal charges of the inside photosensitive pixel line.

11 Claims, 33 Drawing Sheets

PHOTOSENSITIVE PIXEL LINE OF B  21

PHOTOSENSITIVE PIXEL LINE OF G  22

PHOTOSENSITIVE PIXEL LINE OF R  23

SAVING AND STORAGE PART  24

HORIZONTAL TRANSFER ELECTRODE OF R  25

HORIZONTAL TRANSFER ELECTRODE OF R  26

HORIZONTAL TRANSFER ELECTRODE OF G  27

HORIZONTAL TRANSFER ELECTRODE OF G  28

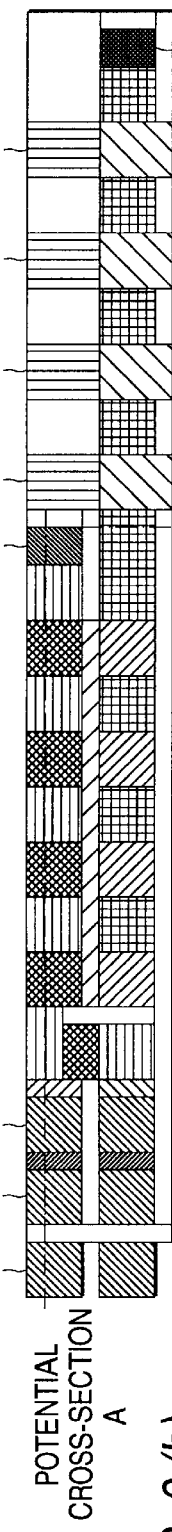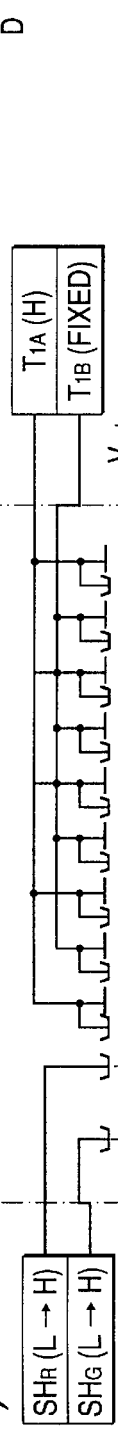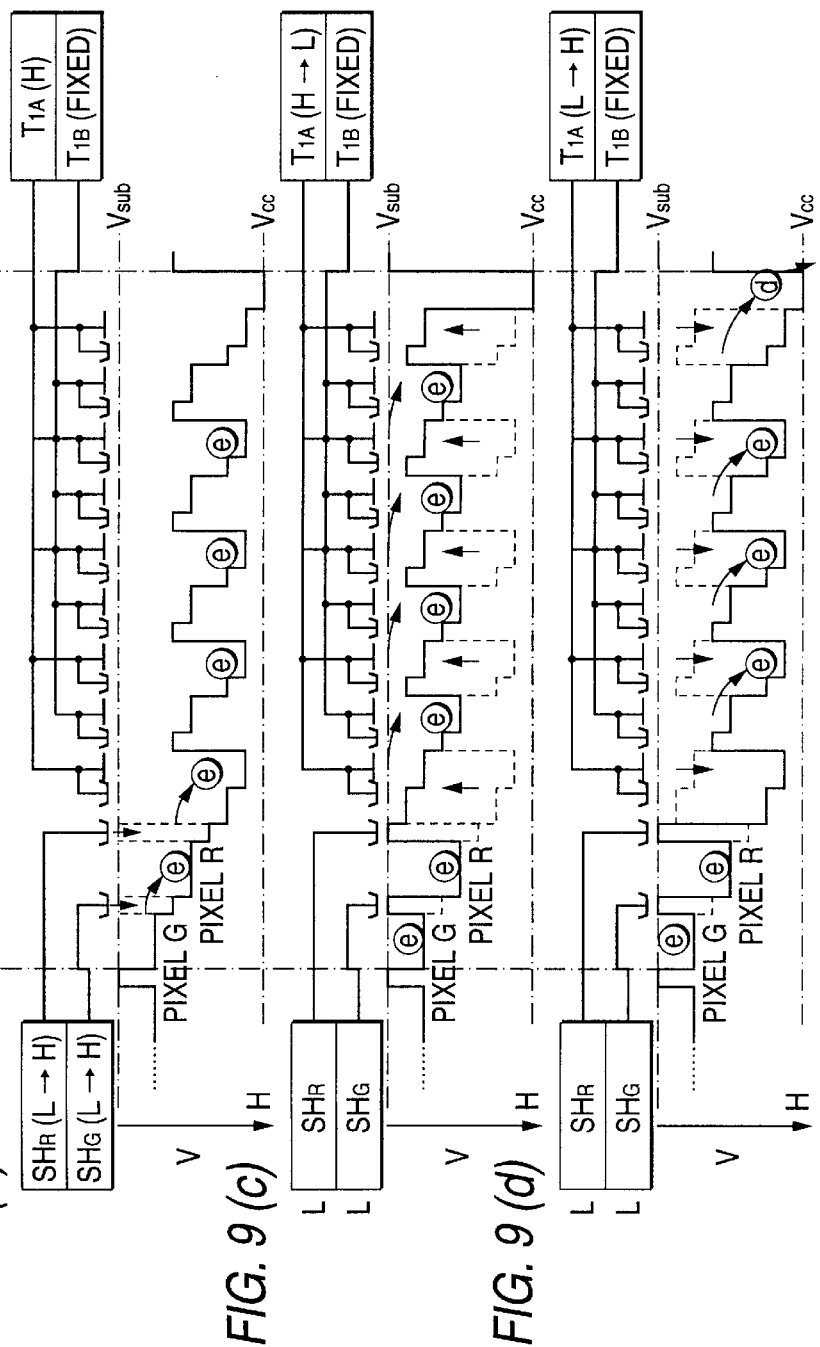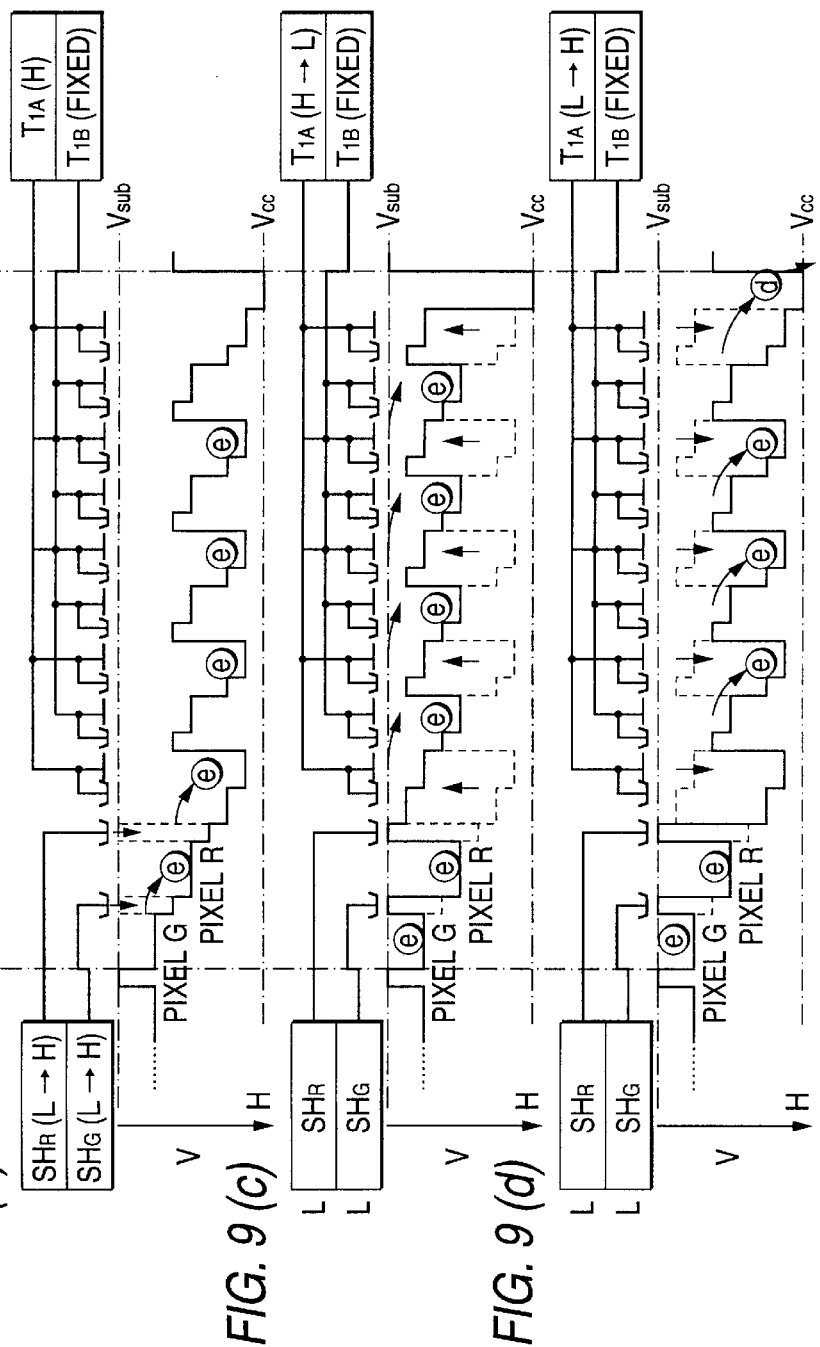
FIG. 9(a)
FIG. 9(b)
FIG. 9(c)
FIG. 9(d)

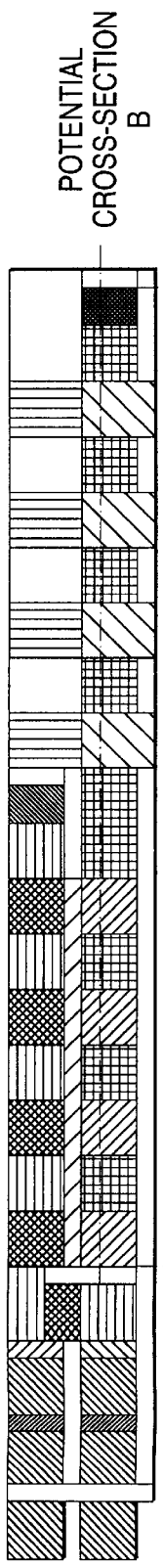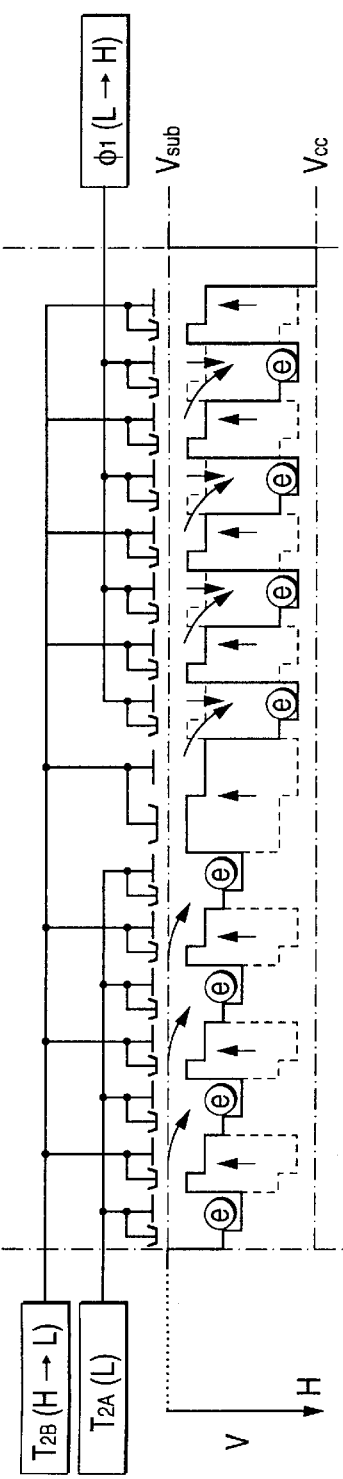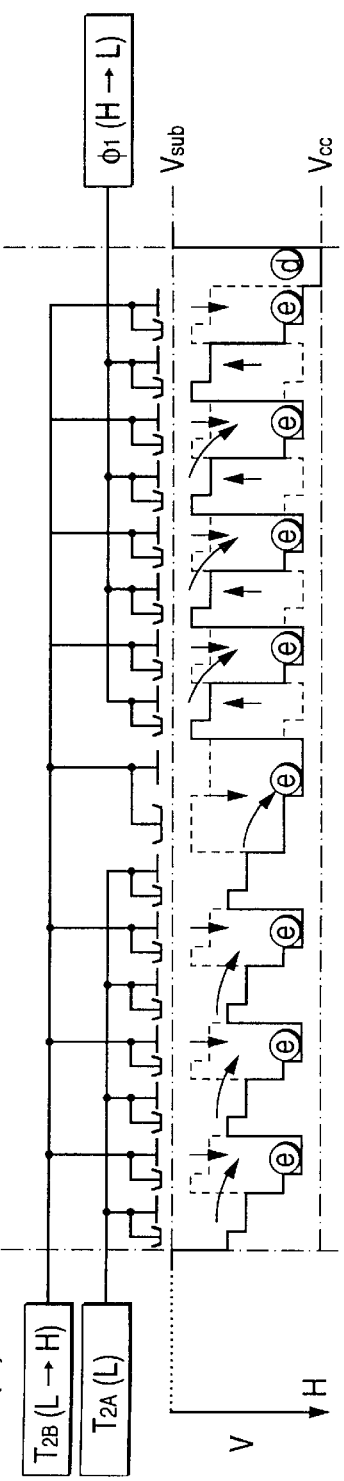
FIG. 10(a)
FIG. 10(b)
FIG. 10(c)

- - - POTENTIAL CROSS-SECTION C
- - - POTENTIAL CROSS-SECTION D

POTENTIAL CROSS-SECTION C

POTENTIAL CROSS-SECTION D t1 EXPOSURE OF 1a LINE IS COMPLETED t4 DATA TRANSFER t2 DATA TRANSFER t5 EXPOSURE OF 2a LINE IS COMPLETED t3 EXPOSURE OF 1b LINE IS COMPLETED t6 DATA TRANSFER t7 READING OF 1-LINE DATA

IMAGE SENSOR, IMAGE READING DEVICE, AND IMAGE READING METHOD

BACKGROUND OF THE INVENTION

1. Field of the Invention

The present invention relates to a multiple-line image sensor for use in a color image reading device and, in particular, to an image sensor and an image reading device having a function of continuously changing the read sub-scanning density of a digital copying machine or the like, and also having a multiple-line storage means.

2. Description of the Related Art

Conventionally, as a color image reading device, there is widely used a color image reading device which includes, on one chip, a 3-line color sensor having three read lines for three colors R (red), G (green) and B (blue). In the color sensor of this type, image information corresponding to one line in a main scanning direction is read out in such a manner that manuscript information is reduction projected onto the surface of the 3-line color sensor by an image forming lens constituting a reduction optical system. Also, image information in a sub-scanning direction is read out by varying a positional relationship between a formed image and a sensor mechanically by use of suitable mechanical means such as a scanning mirror or the like.

Since the respective three read lines for the three colors, namely, R, G and B, in the 3-line color sensor are arranged at different positions on the sensor chip, they read lines on a document extending in the main scanning direction which lines are located at different positions in the sub-scanning direction. For this reason, a color image is read such that the document surface is read sequentially in time series with mechanical sub-scanning and then a registration correction is performed on readout signals. This registration correction is an operation in which the readout signals that are output in time series are delayed on a line-by-line basis so that read lines of the three colors have information as would be obtained by reading the same main scanning line on the document surface.

However, since the read image is quantized in the sub-scanning direction according to a distance (an amount of feed) of the read image to be moved in the sub-scanning direction during one read period (exposure time), the registration correction operation by means of the above delay scanning can only provide accuracy corresponding to an integer-multiple of the feed amount. A residual registration error may cause a case that a black fine line cannot be recognized properly in a digital color copying machine. This error can be eliminated if a read line gap is set at an integer-multiple of the feed amount in the sub-scanning direction. However, in the digital color copying machine, because reduction and enlargement of an arbitrary magnification is performed by changing the scanning density in the sub-scanning direction, the feed amount in the sub-scanning direction varies with the set magnification, which leaves a problem when it is intended to accommodate all magnifications.

FIG. 29 shows a general configuration of an image reading device using a 3-line color sensor, and FIG. 30 illustrates how color misregistration in the sub-scanning direction occurs in this 3-line color sensor.

In the image reading device using the 3-line color sensor, as shown in FIG. 29, to read an image of a document placed on a document placement glass 201, a reflection image of the document is reduction-projected progressively onto a 3-line color CCD sensor 205 through a lens 204 with scanning by a full-rate mirror 202 and half-rate mirrors 203. In this image reading device, for example, the pixel pitch of the sensor is 14 $\mu$m, the document read resolution of the sensor is 16 dots/mm, and the projection magnification of the lens is 0.224 (=0.014×16). In the conventional 3-line color CCD sensor, the read pixel lines R, G and B are arranged in parallel to one another and, therefore, as shown in FIG. 30, different positions on the document surface are read. If the gap between the sensor pixel lines is 168 $\mu$m, positions on the document surface which are spaced apart by 0.75 mm (=0.168/0.224) are read.

In the scanning by the full-rate mirror 202 and half-rate mirrors 203, since the lens 204/sensor 205 system is moved at a constant speed with respect to the document to be read and thus the document information is read and scanned relatively, different pieces of document information on the surface of the document placement glass are read out as the data of different read times by the 3-line color CCD sensor 205. For this reason, this registration correction can be made by delaying the outputs of the sensor on a line-by-line basis by use of a line FIFO of a color registration correction memory 206.

Next, there is shown a general formula to determine the number of delay lines necessary for a line gap correction that is needed when the read magnification is changed.

Del=Gap×Res×Mag where

Del: number of delay lines;

Gap: three-color read line gap as converted a value measured on a document surface (in a conventional case, the gap between R and G as well as between G and B is 0.75 mm, and the gap between R and B is 1.50 mm);

Res: read resolution (in the conventional case, 16 dots/mm); and

Mag: read magnification (1.0 for 100%).

TABLE 1

| Read magnification | 100% | 97.9% | 95.8% | 93.8% | 91.7% |
| --- | --- | --- | --- | --- | --- |
| Number of delay lines of R with respect to B | 24 | 23.5 | 23 | 22.5 | 22 |
| Number of delay lines of G with respect to B | 12 | 11.75 | 11.5 | 11.25 | 11 |

Table 1 shows how the number of delay lines varies for magnification values around 100%. The number of delay lines varies according to the read magnification as shown in Table 1, and thus it is not always an integer. To correct this error, it may be conceivable to equalize the read centers of gravity of the three colors by using an average of data of lines adjoining a read line. However, since the operation to average data of the adjoining images is a blurring operation, the read resolution is deteriorated. Further, since the read resolution is deteriorated only in the color to be subjected to registration correction, a resolution balance between the three colors is lowered. This may disable proper recognition of a black fine line.

FIG. 31 shows an example of black fine line read data of the respective color sensors in a case where the delay amount does not correspond to an integral number of lines, and FIG. 32 shows an example of the read correction by delaying as well as a change of the center of gravity by moving average. As shown in these figures, as a result of execution of the center of gravity correction operation, the read image of G situated in the center of the 3 lines becomes unsharp and, as shown in FIG. 32, although they are the read data of the black fine lines, the values of the center portions thereof and the values of the edge portions thereof are not coincident in the three color read data. This results in coloration and muddy edges. As a countermeasure against this problem, Japanese Patent Examined Publication Nos. Hei. 6-81225 and Hei. 6-20221 have proposed a technique in which the registration correction of decimal portions is effected by independent operations in which the exposure periods of the three-color read lines are deviated from one another. The present inventors have also made a similar proposal in Japanese Patent Application No. Hei. 7-10400.

Now, FIGS. 33A and 33B show examples of shift pulse input timings to the 3-line color CCD sensor and exposure phase timings variable according to the shift pulse input timings. The exposure period timings of the three colors can be changed by the supply timings of shift pulses that control the exposure period of the 3-line color CCD sensor. In an exposure timing control example of FIG. 33A, the number of correction lines between R and G and between G and B is $n+\frac{1}{2}$. In an exposure timing control example of FIG. 33B, the number of correction lines between R and G and between G and B is $n+\frac{1}{4}$ while the number of correction lines between R and B is $2n+\frac{1}{2}$.

Now, FIG. 34 is an explanatory view of a conventional 3-line color CCD sensor, FIG. 35 is an explanatory view of a 3-line color CCD sensor of an intra-pixel transfer system, FIG. 36 is a block diagram of a reading device using the conventional 3-line color CCD sensor, FIG. 37 is a block diagram of a reading device using the 3-line color CCD sensor of an intra-pixel transfer system, and FIG. 38 is a graphical representation which shows a relationship between the sizes of line sensor gaps and the amplitudes of allowable speed variations. In the conventional 3-line color CCD sensor, for example, as shown in FIG. 34, horizontal transfer electrodes are arranged on both sides of their respective light-sensitive pixel lines. On the other hand, in the intra-pixel transfer system, for example, as shown in FIG. 35, the light-sensitive pixel lines of the three lines are arranged such that they adjoin one another, and their horizontal transfer electrodes are disposed on the outside thereof. As shown in FIGS. 36 and 37, the signal charges of the respective three colors are taken out from the horizontal transfer electrodes in such a manner that they are classified into Odd and Even signal charges.

By the way, the 3-line color registration correction in the 3-line color sensor is made in such a manner that the shifted read time is substituted for the shifted read position and then the time is delayed in a unit of lines by the memory. However, to achieve this correction, it is necessary that the feeding in the sub-scanning direction is a uniform linear motion of a high accuracy. Here, if the gap distance between the read pixel lines is great, then the delay time is long and is thus easy to be influenced by variations in the feeding speed of a long cycle, which requires a further accurate sub-scanning direction feeding motion. For this reason, it is desirable that the gap between the read pixel lines is narrower, more preferably, the sensor line gap is in the range of 1 to 2 lines. As can be seen clearly from FIG. 38, if the sensor line gap is less than 2 lines, the allowable range extends rapidly.

However, in the structure of the conventional 3-line sensor shown in FIG. 34, since the horizontal transfer electrodes are arranged as read-out electrodes on both sides of the light-sensitive pixel lines of the respective colors, there arises a problem when the gap between the read pixel lines is reduced down to the range of 1–2 lines. Also, there can be expected another means in which wires are provided between the pixels for taking out the output of the central pixel line of the three pixel lines. In this means, however, the areas of the pixels are reduced and thus the sensitivities of the pixels are decreased down almost to a half, which is insufficient for the specifications which require high speeds, high resolution and low noise.

Techniques for narrowing the sensor gap are proposed in Japanese Examined Patent Publication No. Hei. 6-65230 and Japanese Unexamined Patent Publication No. Sho. 63-191467. These publications employ a system in which the signal charges of the inside photosensitive pixel lines of the respective photosensitive pixel lines of the 3-line sensor are read out through the outside photosensitive pixel lines. This system is referred to as an intra-pixel-line transfer system. That is, in these publications, by using this intra-pixel-line transfer system, the sensor line gap of the center line signals can be reduced down to the range of 1–2 lines through between the pixels without reducing the pixel areas of the sensor to lower the sensitivities of the pixels. An example employing this structure is shown in FIG. 35.

However, in the intra-pixel-line transfer system, since the read signal charges of the center pixel lines of the photosensitive pixel lines of the three lines are read out through the outside pixel lines, it is difficult to employ the above-mentioned exposure timing shifting technique. That is, the signal charges of G are sent from the photosensitive pixel lines of G situated in the center of the three lines through the R photosensitive pixel lines to the horizontal transfer electrodes of G. For this reason, if the exposure timings of R and G are shifted, it interferes with the read-out passage of G during R exposure.

Thus, because the exposure timing control is impossible, the gap between the light-sensitive pixel lines is set to be the integral multiple of the scanning density (which is normally determined by the gap between the pixels in the main scanning direction). This is because, when the scanning magnification is 100% which is the most standard magnification, the gap correction is made only on the integral lines, which eliminates the fear that the resolutions due to the registration correction error and registration correction can be lowered. Due to this restriction, though a photosensitive pixel line gap of less than 2 lines can be technically realized, the actual gap of the pixels themselves in the sub-scanning direction cannot help but 2 lines. There can also be employed a technique in which, by shortening the length of the photosensitive window of the pixel line in the sub-scanning direction, the pixel line gap in the sub-scanning direction can be set as 1 line. However, in this case, the sensor sensitivity is lowered. Further, in the conventional technique, there arises a problem that variations in the magnification cannot be read freely.

SUMMARY OF THE INVENTION

Accordingly, it is an object of the invention to provide an image sensor which can correct the color registration of a 3-line color sensor without lowering the black fine line reading quality regardless of variations in the sub-scanning read density and variations in the read scanning speed.

It is another object of the invention to provide a 3-line color sensor using an intra-pixel-line transfer system which is difficult to be influenced by variations in the speed of a read scanning system and makes it possible to narrow a gap between the photosensitive pixel lines of the 3-line color sensor, in which, when a reduction/enlargement operation of an arbitrary magnification is performed, an exposure phase timing can be adjusted so as to maintain the black fine line reading quality.

It is still another object of the invention to eliminate a restriction on the gap between the photosensitive pixel lines of the 3-line color sensor to thereby reduce the gap down to two lines or less.

To attain the above objects, according to the invention, there is provided an image sensor comprising a photosensitive pixel part including a plurality of photosensitive pixel lines adjacent to each other in a sub-scanning direction, each of said photosensitive pixel lines having a number of photosensitive pixels arranged in a main scanning direction; a horizontal transfer register disposed outside of said photosensitive pixel part and connected to external output lines, for transferring signal charges of said photosensitive pixel lines in the main scanning direction; storage means interposed between said photosensitive pixel lines and said horizontal transfer register, for saving therein signal charges on a pixel-by-pixel basis; and shift gates for controlling transfer of signal charges between said photosensitive pixel lines, said storage means, and said horizontal transfer register, wherein at a time point when exposure of an inside photosensitive pixel line not adjoining said storage means has been finished, signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register by controlling potentials of said photosensitive pixel lines, said storage means, said horizontal transfer register, and said shift gates as well as switching timing of the potentials.

With the above configuration, in the linear color sensor of the intra-pixel-line transfer system in which the gap between a plurality of read photosensitive pixel lines is narrow and the allowance with respect to variations in the read scanning speed is large, signal charges of the photosensitive pixel line under exposure located near the horizontal transfer electrodes can be taken out from the photosensitive pixel line and can be temporarily stored and saved into the storage means. And there can be secured a passage through which signal charges of the photosensitive pixel line remote from the horizontal transfer electrodes can be transferred to the horizontal transfer electrodes. Thanks to this, the exposure phase timings of the photosensitive pixel lines can be shifted from each other.

In the above image sensor, the storage means and the shift gates may be so constructed as to be able to transfer a signal charge in the main scanning direction. The storage means and the shift gates may be so constructed as to be able to transfer a signal charge in both vertical and horizontal transfer directions. In these cases, it can be performed easily to temporarily save signal charges in the midst of exposure, and return them to their original pixels or secure a transfer passage for them.

The storage means may include a semiconductor having an impurity density or a thickness that is so set that a potential of the semiconductor is on a negative side of potentials of the adjoining photosensitive pixel line and the horizontal transfer register when given potentials are applied to the shift gates. In this case, the shift gates can be controlled easily by a simple structure for transfer of signal charges.

The horizontal transfer register may include plural lines of divisional horizontal transfer registers for outputting signal charges in accordance with a pitch of the photosensitive pixels of the photosensitive pixel lines.

The storage means may include plurality lines of storage means arranged in a vertical transfer direction. The horizontal transfer register may include plural lines of horizontal transfer registers, and the storage means may be interposed between the plural lines of horizontal transfer registers. In these cases, it can be performed easily to save and then take out signal charges of the plural photosensitive pixel lines.

According to another aspect of the invention, there is provided an image reading device comprising an image sensor comprising a photosensitive pixel part including a plurality of photosensitive pixel lines adjacent to each other in a sub-scanning direction, each of said photosensitive pixel lines having a number of photosensitive pixels arranged in a main scanning direction; a horizontal transfer register disposed outside of said photosensitive pixel part and connected to external output lines, for transferring signal charges of said photosensitive pixel lines in the main scanning direction; storage means interposed between said photosensitive pixel lines and said horizontal transfer register, for saving therein signal charges on a pixel-by-pixel basis; and shift gates for controlling transfer of signal charges between said photosensitive pixel lines, said storage means, and said horizontal transfer register; and control means for controlling potentials of said photosensitive pixel lines, said storage means, said horizontal transfer register, and said shift gates as well as switching timing of the potentials so that signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register at a time point when exposure of an inside photosensitive pixel line not adjoining said storage means has been finished, whereby said image reading device reads an image based on the signal charges received from said horizontal transfer register.

With the above configuration, by using the linear color sensor of the intra-pixel-line transfer system in which the gap between a plurality of read photosensitive pixel lines is narrow and the allowance with respect to variations in the read scanning speed is large, signal charges of the photosensitive pixel line under exposure near the horizontal transfer electrodes can be once taken out from the photosensitive pixel line and thus can be saved and stored into the storage means, which makes it possible to secure a passage through which signal charges of another photosensitive pixel line remote from the horizontal transfer electrodes can be transferred to the horizontal transfer electrodes.

In the above image reading device, the control means may determine exposure start timing and exposure end timing of the respective photosensitive pixel lines in accordance with a reduction/enlargement magnification of image reading. The storage means may be so constructed as to be able to transfer signal charges in both vertical and horizontal transfer directions, and the control means may selectively operate the shift gates so that after the signal charges of the inside photosensitive pixel line are transferred to the storage means and the horizontal transfer register, the signal charges of the outside photosensitive pixel line are returned to photosensitive pixels where the signal charges existed before being saved. In these cases, there can be secured a passage through which signal charges of the photosensitive pixel line remote from the horizontal transfer electrodes can be transferred, the exposure period can be made continuous, and the mutual exposure phase timings of the photosensitive pixel lines can be shifted from each other.

The control means may selectively operate the shift gates so that after the signal charges of the inside photosensitive pixel line are transferred to the storage means and the horizontal transfer register, the signal charges of the outside photosensitive pixel line being saved in the storage means are added to signal charges accumulated in corresponding photosensitive pixels of the outside photosensitive pixel line after saving of the signal charges. In this case, even if signal charges are saved in the midst of exposure, signal charges of one exposure period can be taken out.

The horizontal transfer register may include plural lines of divisional horizontal transfer registers for outputting signal charges in accordance with a pitch of the photosensitive pixels of the photosensitive pixel lines, and the control means may selectively operate the shift gates so that after the signal charges of the photosensitive pixels of the outside photosensitive pixel line are saved into the storage means, the signal charges of the inside photosensitive pixel line are transferred to different locations of the storage means from locations where the signal charges of the outside photosensitive pixel line are saved or to the divisional horizontal transfer registers. Alternatively, the storage means may include plural lines of storage means arranged in a vertical transfer direction, and form two systems of vertical transfer passages, and the control means may selectively operate the shift gates so that after the signal charges of the outside photosensitive pixel line are saved into the storage means of one of the two systems of vertical transfer passages, the signal charges of the inside photosensitive pixel line are transferred to the storage means of the other system. In these cases, signal charges of a plurality of photosensitive pixel lines can be saved and taken out easily.

According to a further aspect of the invention, there is provided an image reading method comprising the steps of saving a signal charge of an outside photosensitive pixel under exposure into storage means, and generating a passage between an inside photosensitive pixel and a horizontal transfer register; transferring a signal charge of said inside photosensitive pixel in an exposure-completed state to said outside photosensitive pixel the signal charge of which has been saved in the storage means; transferring the signal charge of said inside photosensitive pixel which has been transferred to said outside photosensitive pixel to a portion of said storage means forming said passage; and transferring the signal charge of said inside photosensitive pixel which has been transferred to the portion of said storage means to said horizontal transfer register.

As described above, according to the invention, the restriction that the gap between the photosensitive pixel lines should be an integer can be eliminated, so that the gap between the photosensitive pixel lines can be narrowed. This increases the allowance with respect to vibrations of the read scanning system.

BRIEF DESCRIPTION OF THE DRAWINGS

FIG. 9 is an explanatory view of variations in the potential distribution of a first transfer electrode line as well as an operation to transmit the signal charges of the photosensitive pixels to the first transfer electrode line;

FIG. 10 is an explanatory view of variations in the potential distribution of a second transfer electrode line as well as an operation to transmit the signal charges of the photosensitive pixels to the second transfer electrode line;

DESCRIPTION OF THE PREFERRED EMBODIMENTS

Preferred embodiments of the invention will be hereinafter described with reference to the accompanying drawings.

Figure 1:
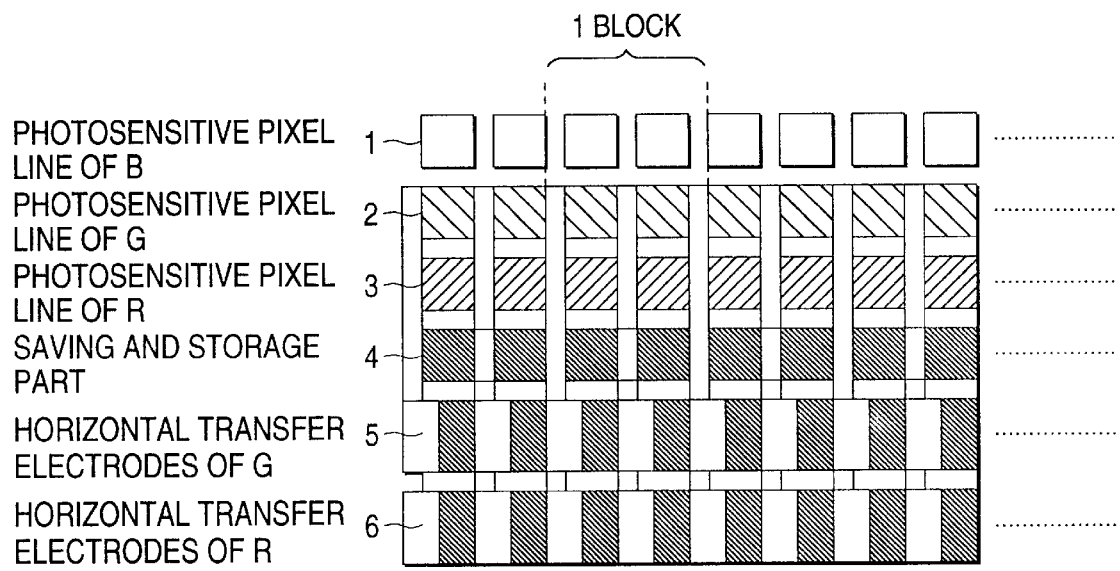
FIG. 1 is an explanatory view of a first embodiment of an image sensor having a storage part according to the invention.
Figure 2:
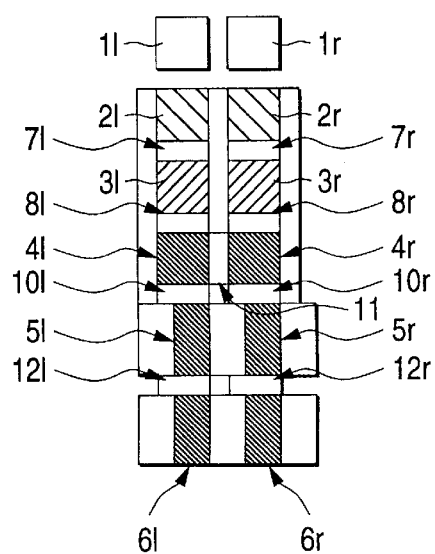
FIG. 2 is an explanatory view of the structure of one block of the image sensor having a storage part according to invention.

FIG. 1 is an explanatory view of the structure of a first embodiment of an image sensor having a storage part according to the invention, while FIG. 2 is an explanatory view of the structure of one block of the image sensor having a storage part according to the invention. In the image sensor shown in FIG. 1, out of signal charges accumulated or stored in three (that is, R, G and B) photosensitive pixel lines respectively shown in the upper portion of FIG. 1, the signal charges of the 2 colors (that is, G and R) are read out in the downward direction of FIG. 1, and signals are transferred through a saving and storage part 4 to electrode systems which are provided one for each color, that is, horizontal transfer electrodes 5 and 6 (which are used to read out signal charges of one line by converting those into a time-series signal). Two pixels form one block.

As for a specific structure of each block, first, a shift gate $7_r$ used to read out the signal charges of G is interposed between the right photosensitive pixel $2_r$ of G and the right photosensitive pixel $3_r$ of R, while a shift gate $7_l$ is interposed between the left photosensitive pixel $2_l$ of G and the left photosensitive pixel $3_l$ of R. Also, a shift gate $8_r$ used to read out the signal charges of R is interposed between the right photosensitive pixel $3_r$ of R and the right saving electrode $4_r$ of a saving and storage part 4, while a shift gate $8_l$ is interposed between the left photosensitive pixel $3_l$ of R and the left saving electrode $4_l$ of the saving and storage part 4. Further, a shift gate 11 is interposed between the right saving electrode $4_r$ and the left saving electrode $4_l$. Here, the right side of the signal charges read out from the photosensitive pixels is read out by the right saving electrode $4_r$, while the left side thereof is read out by the left saving electrode $4_l$. And the signal charges of the photosensitive pixel line 2 of G situated in the center of the 3 lines are read out through the photosensitive pixel line 3 of R. Further, between the right horizontal transfer electrode $5_r$ of G and the saving electrode $4_r$, there is interposed a shift gate $10_r$ and, between the left horizontal transfer electrode $5_l$ of G and the left saving electrode $4_l$, there is interposed a shift gate $10_l$. Similarly, between the right horizontal transfer electrode $5_r$ of G and the right horizontal transfer electrode $6_r$ of R, there is interposed a shift gate $12_r$ and, between the left horizontal transfer electrode $5_l$ of G and the left horizontal transfer electrode $6_l$ of R, there is interposed a shift gate $12_l$.

Figure 3:
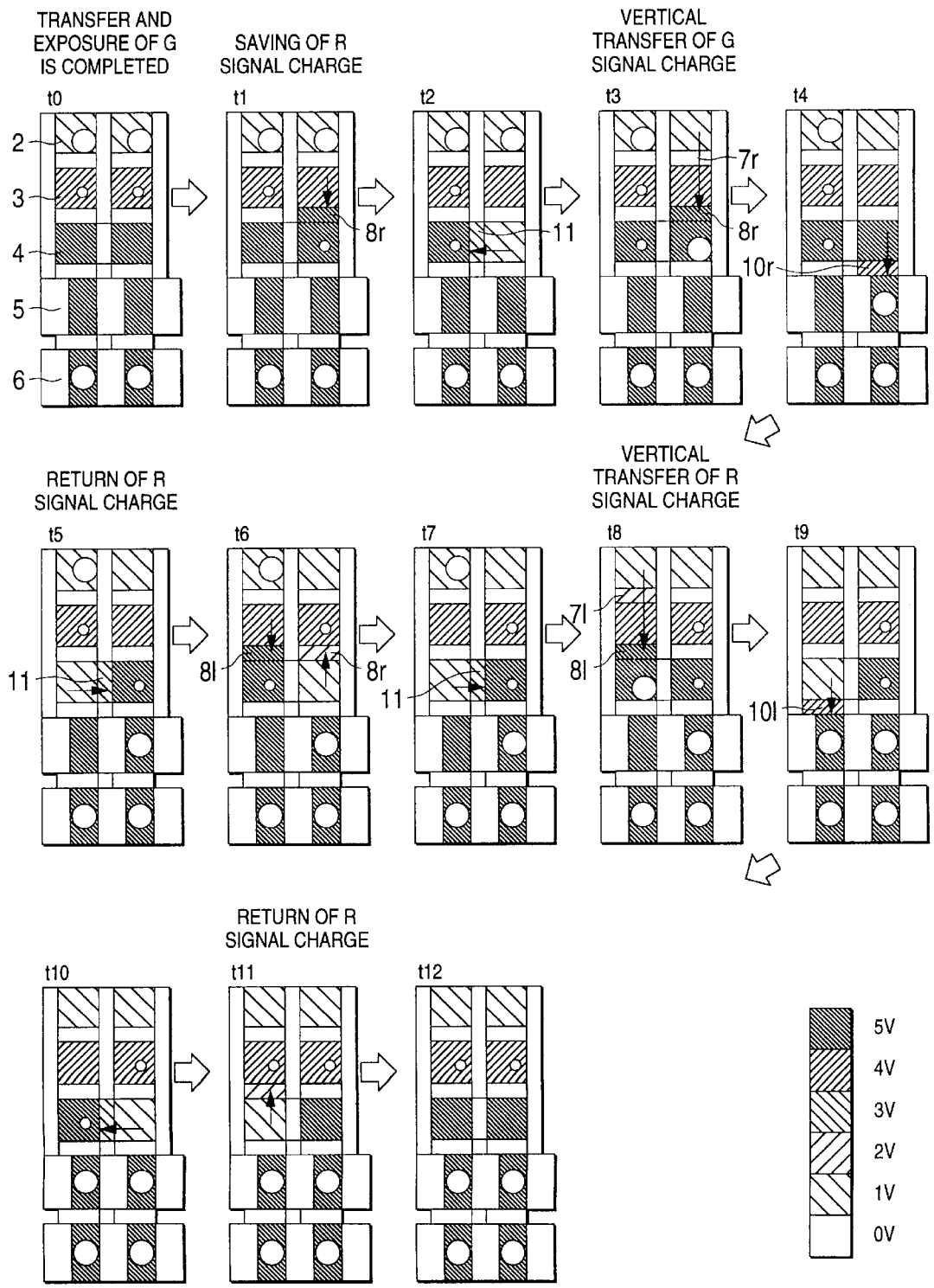
FIG. 3 is an explanatory view of an operation to read out the signal charges of G through the pixels of R while R is being exposed after the exposure of G is completed.
Figure 4:
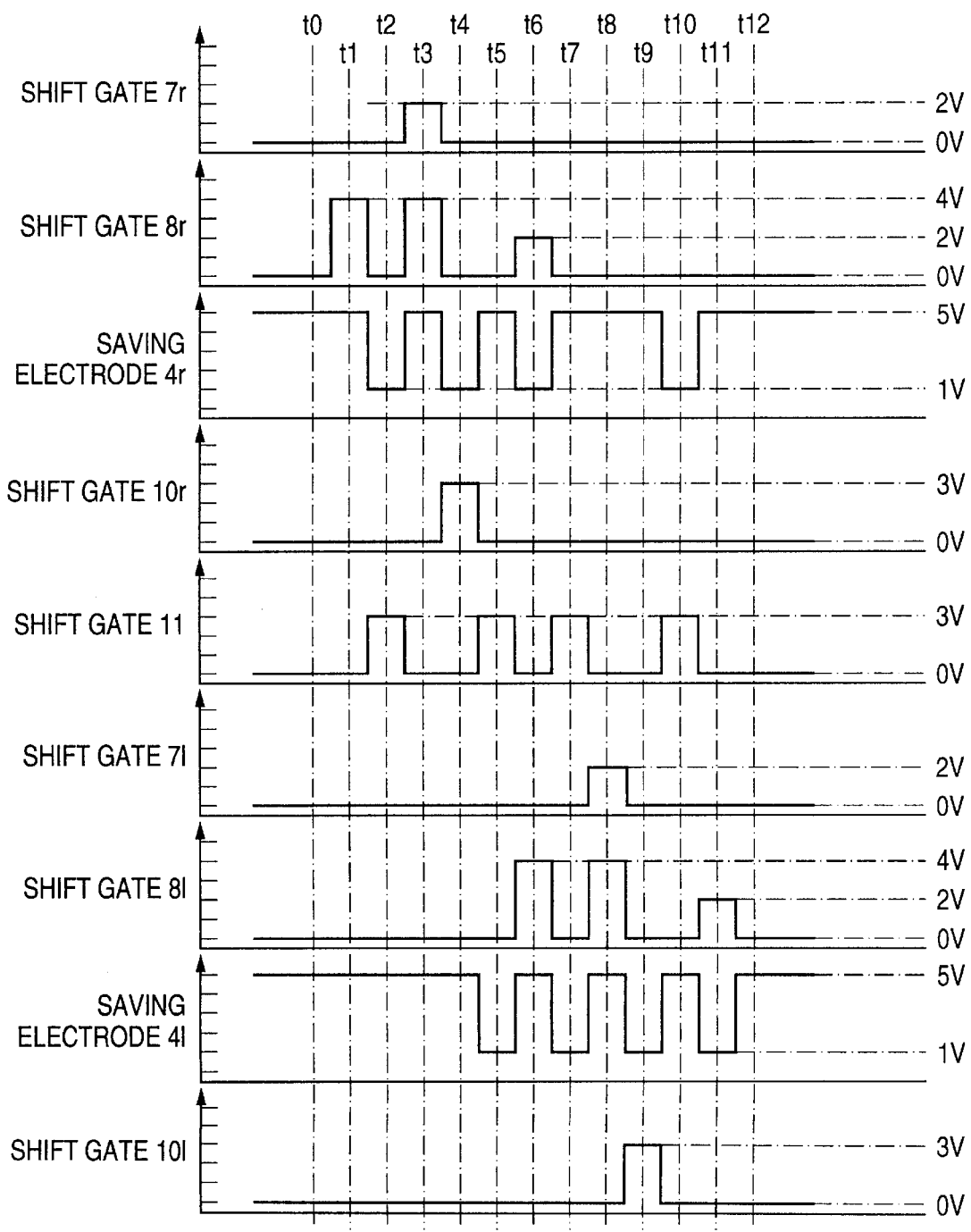
FIG. 4 is a timing chart of drive voltage signals to be applied to the respective electrodes of the image sensor.

Now, FIG. 3 is an explanatory view of an operation to read out the signal charges of G through the pixel of R during R exposure after completion of G exposure. FIG. 4 is a timing chart of drive voltage signals respectively to be applied to the respective electrodes of the present image sensor. In FIG. 3, a large circle represents a signal charge in a state that exposure has been completed and a small circle expresses a signal charge in a state that exposure is in progress. In the bottom-right portion of FIG. 3, hatching patterns are correlated with respective voltage levels that are applied to an electrode.

Next, a description will be given below of an effect obtained by providing the saving and storage part 4 in a passage through which the signal charges are transferred from the photosensitive pixel lines 2 and 3 by use of an intra-pixel-line transfer system. In the intra-pixel-line transfer system, to shift the exposure timings of the respective colors, a subject to attained is to read out signal charges through the interior of the side read photosensitive pixel line (in the present embodiment, R) being exposed at a time point when ½-line exposure of the central read photosensitive pixel line (in the present embodiment, G) is completed.

In FIG. 3, time t0 shows a timing at which the exposure of a photosensitive pixel line of G by an amount corresponding to one line is completed. At this timing, the photosensitive pixel line of R is being exposed. First, when the exposure of the photosensitive pixel line of G has been completed, then at time t1, a shift gate $8_r$ is changed from 0 V to 4 V, while the signal charge of the right pixel of R is moved along a potential gradient in a high potential direction and is input into the saving electrode $4_r$. Next, at time t2, the saving electrode $4_r$ is changed from 5 V to 1 V and the shift gate 11 is changed from 0 V to 3 V, while the right signal charge of R is moved to the saving electrode $4_l$. This makes it possible to secure a passage for transferring the right signal charge of G to the horizontal transfer electrode of G. Therefore, by controlling the respective electrodes $7_r$ and $8_r$ at time t3 and t4, the right signal charges of G can be sequentially moved downwardly in a vertical direction and can be thereby carried to the horizontal transfer electrode.

Then, there is carried out an operation in which the signal charge of R taken out during the exposure thereof is returned to a photosensitive pixel in which the signal charge was initially present. That is, in this operation, at time t5, the saving electrode $4_l$ is changed from 5 V to 2 V and the shift gate 11 is changed from 0 V to 3 V, while the right signal charge of R saved to the saving electrode $4_l$ is transferred to the saving electrode $4_r$. Next, at time t6, the saving electrode $4_r$ is change from 5 V to 2 V and the shift gate $8_r$ is changed from 0 V to 2 V, while the right signal charge of R is returned to the photosensitive pixel of R. At the same timing, the shift gate $8_l$ is changed from 0 V to 4 V, the saving electrode $4_l$ is changed from 1 V to 5 V, the left signal of R is transferred to the saving electrode $4_l$ for its saving operation, and, at the same time, the shift gate 11 is returned to 0 V.

Similarly, at time t7, the left signal charge of R is saved to the saving electrode $4_r$ and, at time t8 and t9, the right signal charge of G is transferred to the horizontal transfer electrode $5_l$. At time t10 and t11, the left signal charge of R is returned to its original photosensitive pixel.

By means of the above-mentioned series of operations, the signal charge of G with one exposure period thereof completed can be read out into the horizontal transfer electrode 5.

Figure 5:
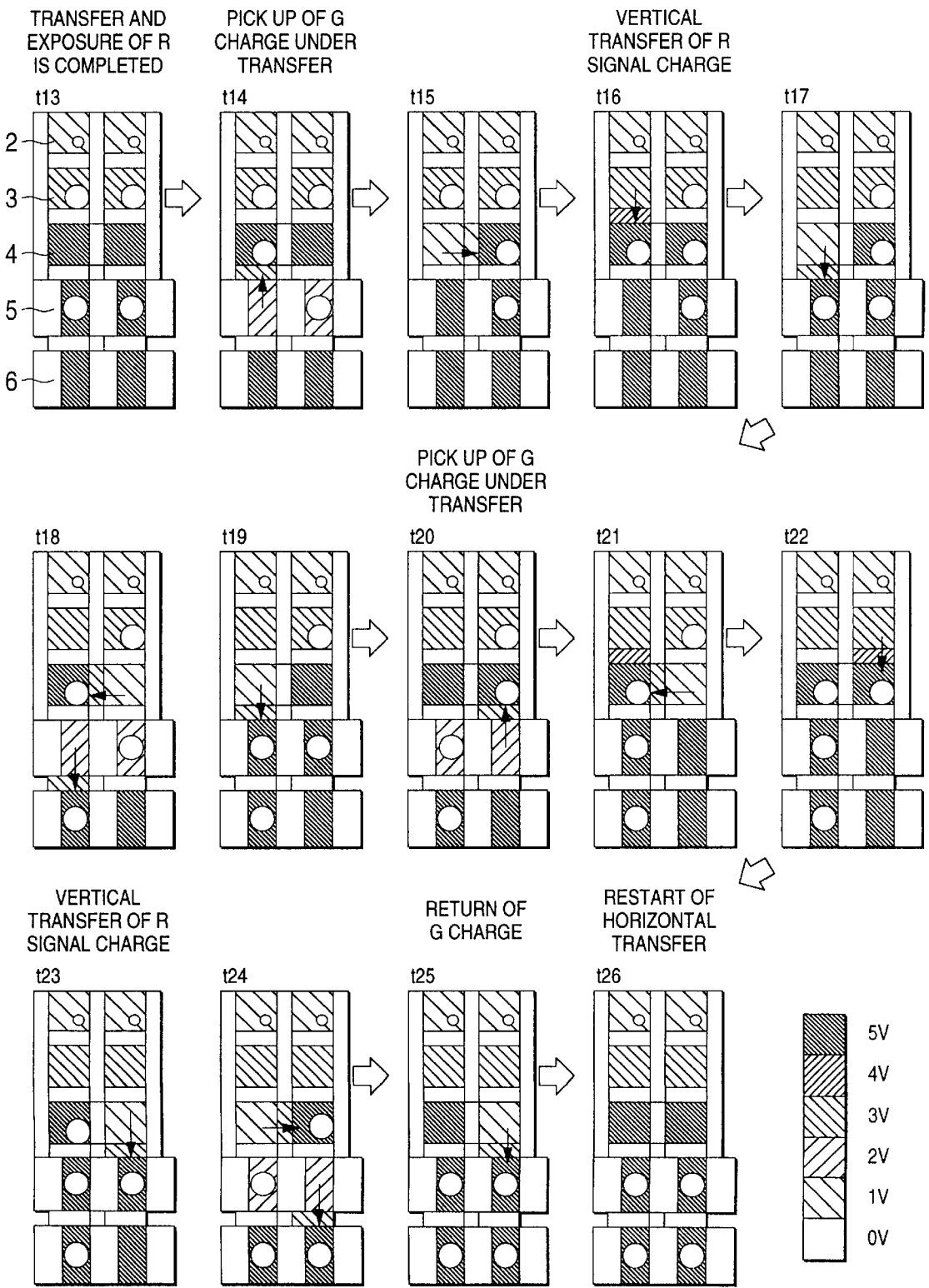
FIG. 5 is an explanatory view of an operation to read out the signal charges of R after the exposure of R is completed.
Figure 6:
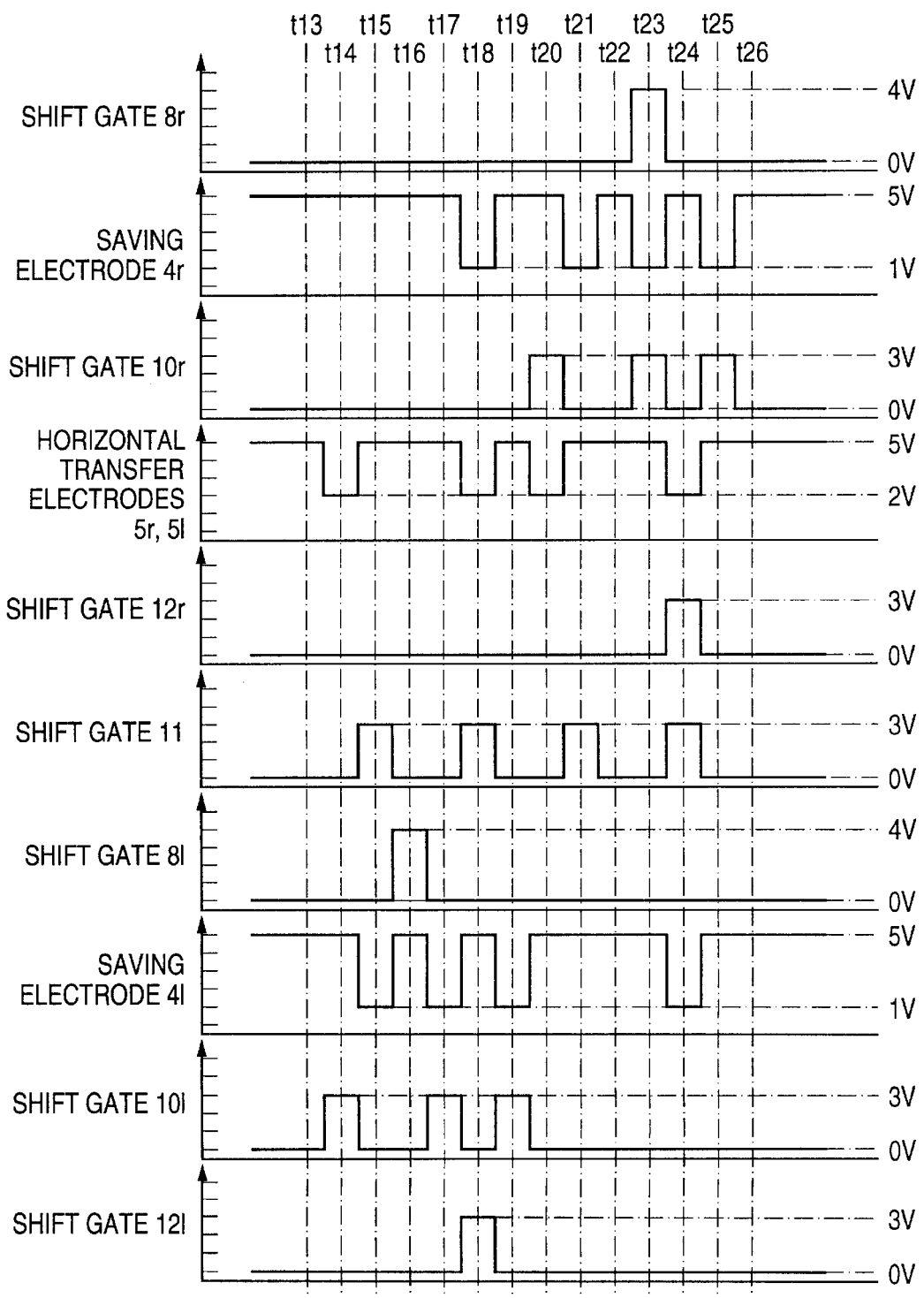
FIG. 6 is a timing chart of drive voltage signals to be applied to the respective electrodes of the image sensor.

According to the present structure, upon completion of the exposure of R, the signal charges of R must be transferred through the horizontal transfer electrode 5 of G being transferred in the horizontal direction to the horizontal transfer electrode 6 of R. In this case as well, the object can be achieved by use of the saving and storage part 4 similarly to the previously-described case. FIG. 5 is an explanatory view of an operation to read out the signal charges of R after completion of the exposure. FIG. 6 is a timing chart of drive voltage signals which are applied to the respective electrodes.

In FIG. 5, time t13 expresses the exposure end timing of R. When the R exposure has ended, then firstly at time t14, the horizontal transfer electrode $5_l$ of G is changed from 5 V to 2 V, the shift gate $10_l$ is changed from 0 V to 3 V, and the signal charge of G under suspension of horizontal transfer is taken out into the saving electrode $4_l$. Next, at time t15, the horizontal transfer electrode $5_l$ and shift gate $10_l$ are respectively returned to their original states, that is, from 2 V to 5 V and from 3 V to 0 V, the saving electrode $4_l$ is changed from 5 V to 2 V, the shift gate 11 is changed from 0 V to 3 V, and the signal charges of G are saved into the saving electrode $4_r$. By use of the thus-formed passage which extends from the photosensitive pixel $3_l$ of R to the horizontal transfer electrode $6_l$, at time t16, t17 and t18, the signal charges of the left photosensitive pixel $3_l$ of R are transferred sequentially to the horizontal transfer electrode $6_l$ of R.

At time t18, the saving electrode $4_r$ is changed from 5 V to 1 V, the shift gate 11 is changed from 0 V to 3 V, the signal charges of G saved to the saving electrode $4_r$ are transferred to the saving electrode $4_l$. At time t19, the shift gate 11 is returned from 3 V to 1 V, the saving electrode $4_l$ is changed from 5 V to 1 V, the shift gate $12_l$ is changed from 0 V to 3 V, and the signals charges of G are respectively returned to their original horizontal transfer electrode $5_l$.

Similarly to the operations described so far, for the signal charges of the right photosensitive pixel $3_r$ of R as well, at time t20 to t25, a transfer passage can be secured by moving and saving the present signal charges to the saving electrode $4_l$ and the transfer of the present signal charges can be then carried out by use of the present transfer passage.

Here, in the above-mentioned operations, there occurs a case in which voltages of three levels are applied to one electrode in order to move the signal charges in both directions. However, this can be controlled by previously preparing three voltage levels in a driver which is used to supply a pulse to the CCD.

As described in the above-mentioned two operations, between the photosensitive pixel lines 2 and 3 and the horizontal transfer electrodes 5 and 6, there is provided the saving and storage part 4 consisting of the two saving electrodes $4_r$ and $4_l$, and the signal charges of R under exposure are taken out once into the saving and storage part 4 to thereby secure a transfer passage for transfer of the signal charges of G after exposed, which makes it possible to read out the signal charges of G through the photosensitive pixels of R under exposure. Also, by transferring in both directions the signal charges of R taken out during the exposure thereof to thereby return them to their original photosensitive pixel lines, the exposure operation can be continued. Further, this saving and storage part 4 can be used also when the signal charges of R are transferred to the horizontal transfer electrode 6 through the horizontal transfer electrode 5 of G being transferred in the horizontal direction. This makes it possible to control or shift the color exposure phase timings from one another, which has been difficult according to the prior art. Due to this, it is possible to prevent the color registration correction performance from being lowered when the scanning density in the sub-scanning direction is varied, which scanning density variation is used for a magnification varying mode in a digital color copying machine. Further, in this manner, since the registration correction of decimal portions can be made with high accuracy, there is eliminated the need that the gap between the photosensitive pixel lines should be the integer multiple of the pixel pitch, which in turn makes it possible to set the gap between the pixel lines in less than 2 lines (for example, the pixel line gap can be set at 1.5 lines).

Figure 7:
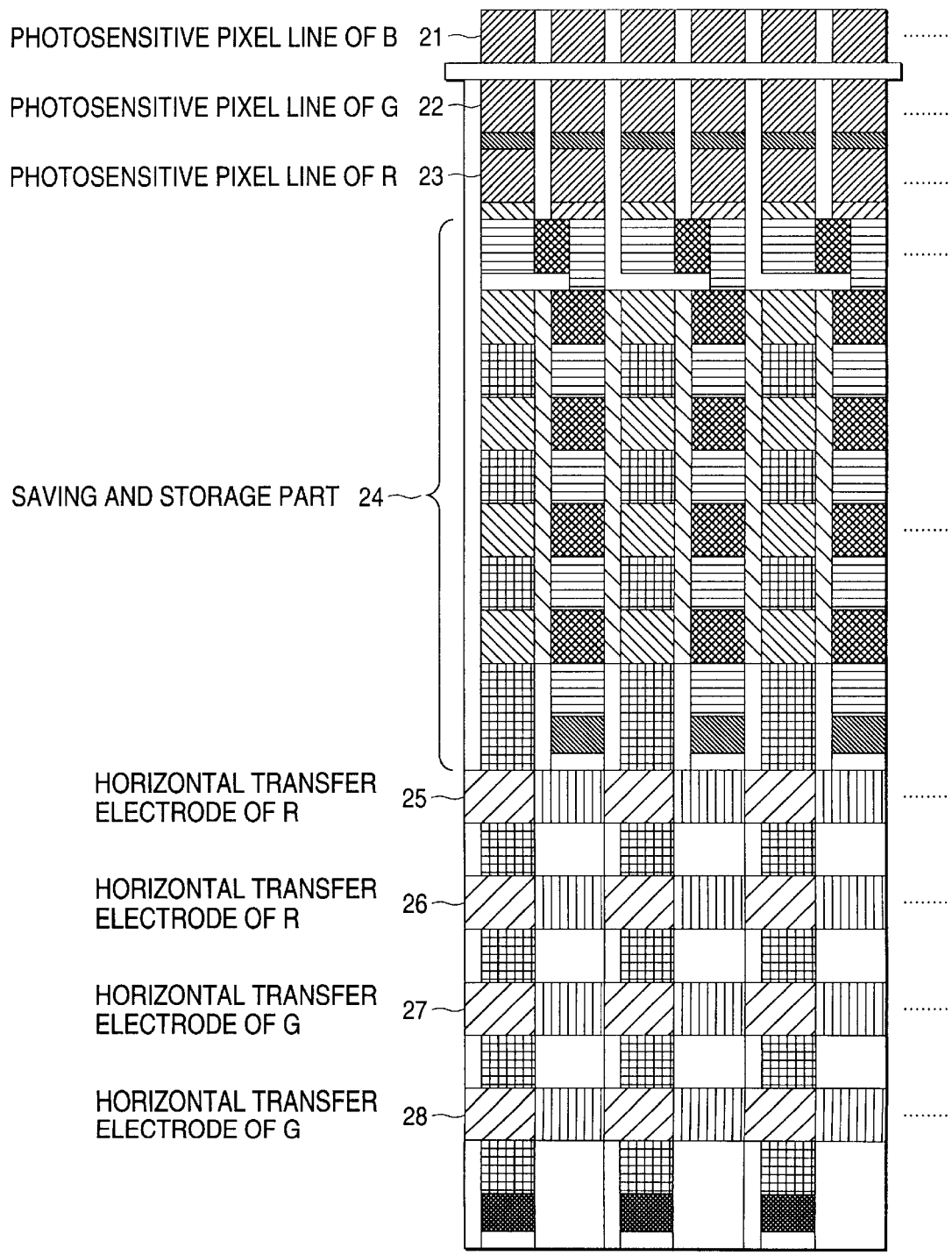
FIG. 7 is an explanatory view of a second embodiment of an image sensor having a storage part according to the invention.
Figure 8:
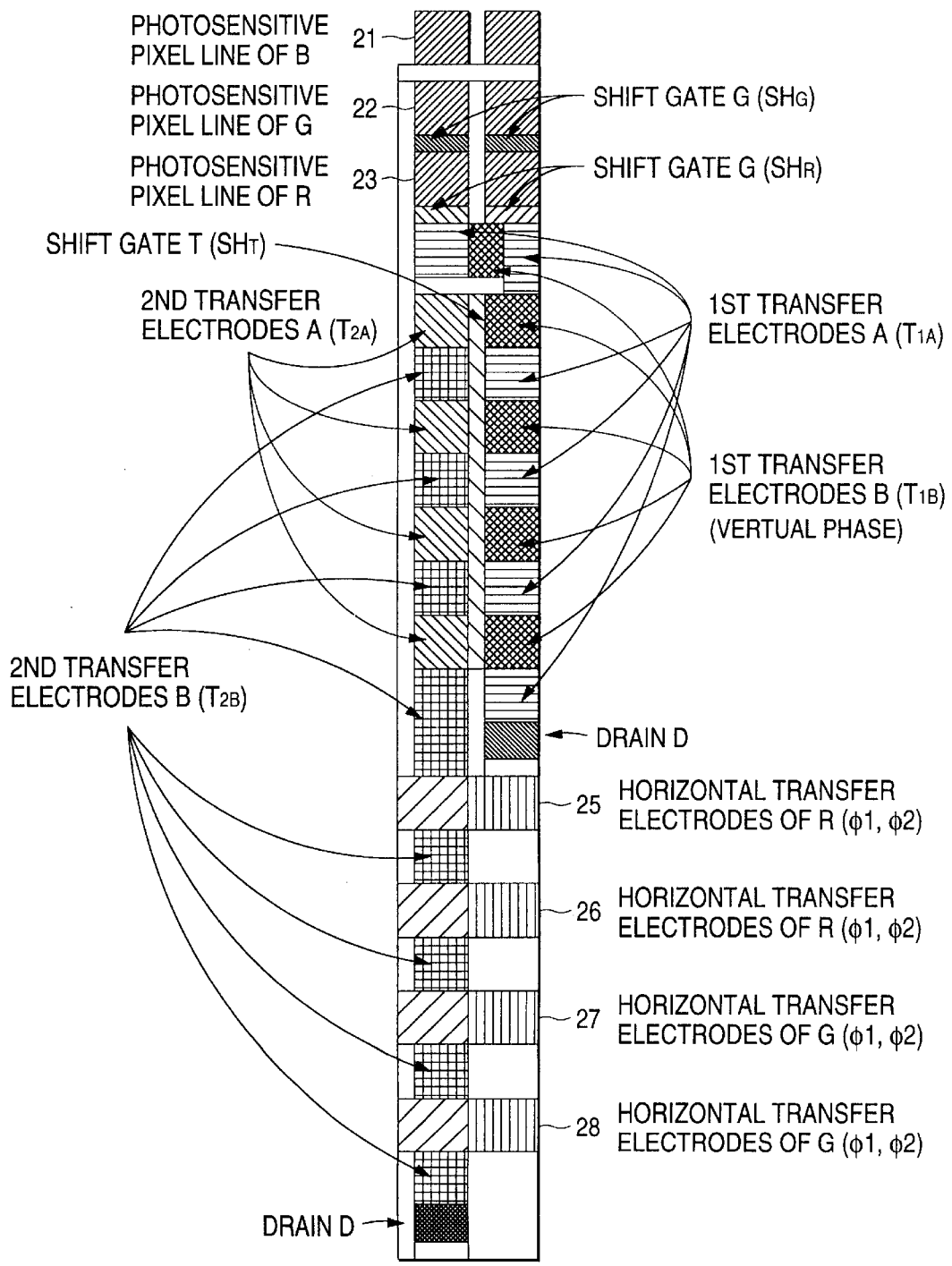
FIG. 8 is an explanatory view of the structure of one block of the image sensor shown in FIG. 7.

Next, a description will be given below in detail of a second embodiment of an image sensor according to the invention. FIG. 7 is an explanatory view of the structure of the second embodiment having a storage part according to the invention. FIG. 8 is an explanatory view of the structure of one block of the image sensor shown in FIG. 7.

The image sensor shown in FIG. 7 is structured such that, out of the signal charges that are stored in three photosensitive pixel lines 21–23 shown in the upper portion of FIG. 7 and corresponding to the three lines of colors R, G and B, the signal charges of the two colors R and G can be read out, and also that signals can be transferred through a saving and storage part 24 to horizontal transfer electrode systems 25–28 (which serve to read out signal charges of one line by converting those into a time-series signal), while such horizontal transfer electrodes are provided in such a manner that two systems consisting of one even system and one odd system are given to each of the colors.

In each block of the present image sensor, as shown in FIG. 8, a shift gate $SH_G$ for reading out the signal charges of G is interposed between the photosensitive pixel line 22 of G and the photosensitive pixel line 23 of R, while a shift gate $SH_R$ for reading out the signal charges of R is interposed between the photosensitive pixel line 23 of R and the saving and storage part 24. Here, the signal charges of the G photosensitive pixel line 22 situated in the center of the three color lines are read out through the photosensitive pixel line 23 of R.

The saving and storage part 24 comprises a first transfer electrode line and a second transfer electrode line. Also, the first and second transfer electrode lines both include stages necessary to transfer the even and odd signal charges of the two colors R and G to horizontal transfer electrodes 25–28, and also they include two systems, that is, A and B systems of electrodes $T_{1A}$, $T_{1B}$, $T_{2A}$ and $T_{2B}$, respectively. And between the first and second transfer electrode lines, there is interposed a shift gate $SH_T$ which can be operated in linking with the second transfer electrode line $T_{2A}$ of the A system. Also, at the respective terminal points of the first and second transfer electrode lines, there are provided drains D which are used to discharge excessive dark output components. The second transfer electrode line $T_{2B}$ is used to carry the signal charges to the horizontal transfer electrodes 25–28 forming the two systems of the two colors R and G which are respectively located in front of the drains D.

FIG. 9 is an explanatory view of variations in the potential distribution of the first transfer electrode line as well as an operation to transmit the signal charges of the photosensitive pixels to the first transfer electrode line. In particular, FIG. 9(a) shows the structure of a sensor, while FIGS. 9(b)–9(d) show the drive signals of the respective electrodes and variations in the drive signals. In the present potential distribution, according to a customary expression, as the levels of the potentials become higher, they are shown in the lower portions of the distribution. As is well known, the signal charges are negative and flow in the high potential direction. The reason for use of the above customary expression is that it is easy to understand by intuition to express that the signal charges flow in the lower direction.

First, a description will be given of an operation to feed the signal charges of the photosensitive pixels to the first transfer electrode with reference to FIG. 9(b). In this case, with the first transfer electrode line $T_{1A}$ set at H, the shift gate $SH_R$ is changed from L to H. The signal charges of R are read out according to the potential gradient into the portion of the first transfer electrode line where the electrode $T_{1A}$ is located. At the same time, if the shift gate $SH_G$ is changed from L to H, then the signal charges of G are also read out through the photosensitive pixels of R into the portion of the first transfer electrode line where the electrode $T_{1A}$ is located.

Further, referring to the signal charges that are read out into the first transfer electrode $T_{1A}$, as shown in FIGS. 9(c) and 9(d), the first transfer electrode $T_{1A}$ of the A system is changed in the order of H, L and H, and the first transfer electrode $T_{1B}$ of the B system is fixed at a level between H and L of the first transfer electrode $T_{1A}$ of the A system so that this level can operate as a virtual phase, whereby the signal charges read into the first transfer electrode $T_{1A}$ can be transferred to the right (the side that is near the horizontal transfer electrode) sequentially. When transferred down to the drains D in the final stage, the signal charges (dark output portions) can be discharged here from the drains D.

FIG. 10 is an explanatory view of variations in the potential distribution of the second transfer electrode line as well as an operation to transmit the signal charges of the photosensitive pixels to the second transfer electrode line. FIG. 10(a) shows the structure of a sensor, and FIGS. 10(b) and 10(c) show the drive signals of the respective electrodes and variations in the drive signals. In the second transfer electrode line, as shown in FIGS. 10(b) and 10(c), the second transfer electrodes $T_{2B}$ of the B system are changed in the order of H, L and H, and one horizontal transfer electrodes φ1 is changed in the order of L, H and L, whereby the signal charges can be sequentially transferred to the right (that is, in the direction of the horizontal transfer electrodes). At this time, the second transfer electrodes $T_{2A}$ of the A system are fixed at L. And the potential level of the second transfer electrode line when the second transfer electrodes $T_{2A}$ of the A system is set at L is set at a level between H and L of the second transfer electrodes $T_{2B}$ of the B system, so that they can operate as a virtual phase similarly to the first transfer electrodes $T_{1B}$ of the B system.

Figure 11:
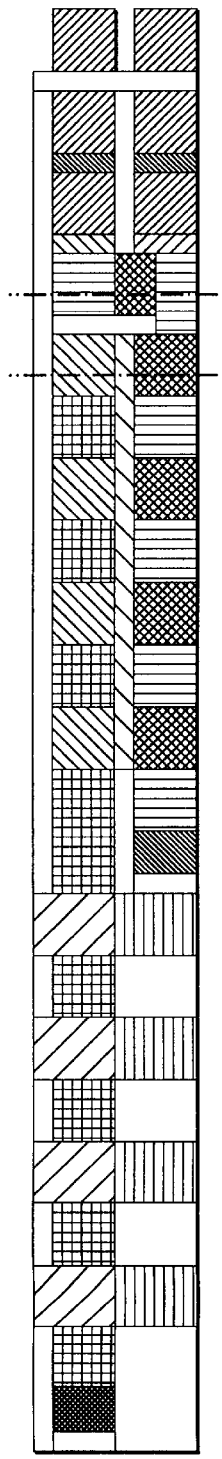
FIG. 11 is an explanatory view of variations in a potential distribution within a saving and storage part in the horizontal transfer of signal charges and the horizontal transfer operation.
Figure 11:
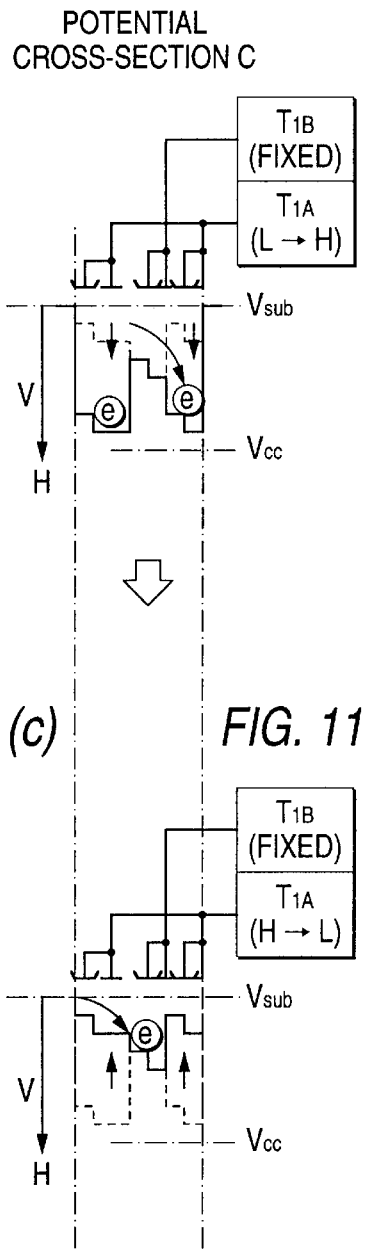
Figure 11:
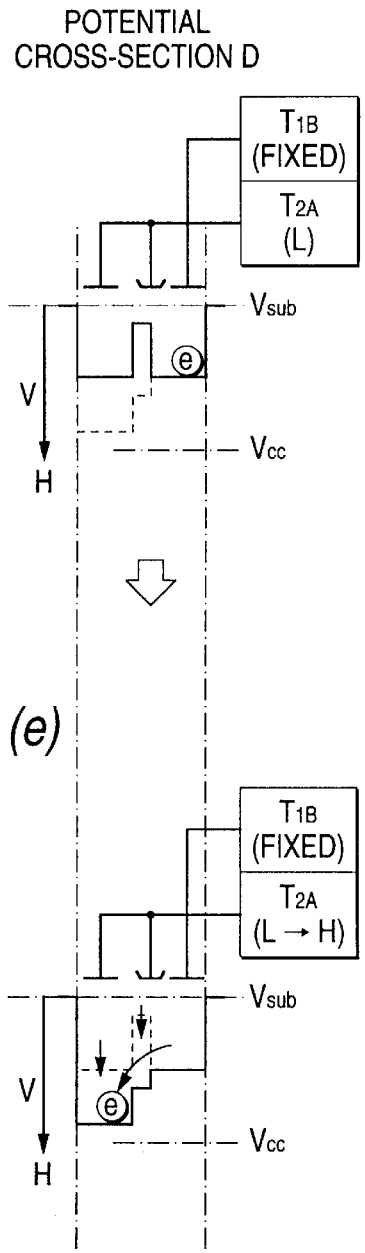
Figure 11:
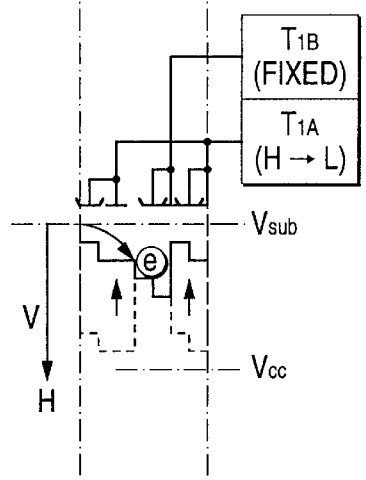
Figure 11:
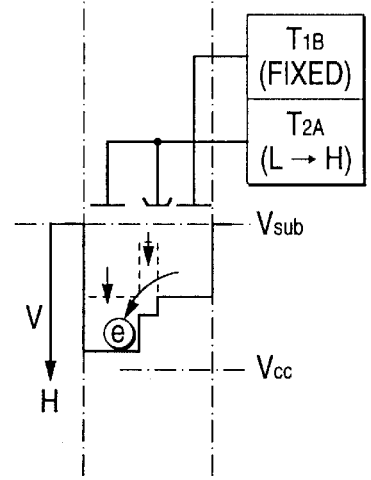

Next, a description will be given below of an operation to transfer the signal charges in the horizontal direction within the saving and storage part. FIG. 11 is an explanatory view of variations in a potential distribution within the saving and storage part when the signal charges are transferred in the horizontal direction as well as an operation to transfer the signal charges in the horizontal direction within the saving and storage part. FIGS. 11(a) shows the structure of a sensor, and FIGS. 11(b)–11(f) respectively show the drive signals of the respective electrodes and variations in the potential distribution. First, in a potential section C shown in FIG. 11(a), there is shown a portion of the first transfer electrode line into which signal charges read out in parallel from two even and odd systems of read pixels are transferred. This is a part of the first transfer electrode line in which the transfer electrodes are closely connected with each other. The signal charges of the pixel line are read into the two mutually adjoining transfer electrodes of the first transfer electrodes $T_{1A}$. Then, as shown in FIGS. 11(b) and 11(c), if the first transfer electrodes $T_{1A}$ are changed in the order of L, H and L, then the signal charges are transferred to the right sequentially. Then, in accordance with meandering of the first transfer electrode, the signal charges that have been transferred to the right are transferred downwardly as shown in FIG. 9.

FIGS. 11(d) and 11(f) show variations in the potential distribution in the potential section D in FIG. 11(a) which are caused by the states of the drive signals. This part is used to move in parallel a group of signal charges under transfer through the first transfer electrode line to the second transfer electrode line. First, the signal charges existing on the first transfer electrode side (on the right side) when the second transfer electrodes $T_{2A}$ are at L can be transferred to the second transfer electrode side (to the left side) by varying the second transfer electrodes $T_{2A}$ from L to H. In other words, since the second transfer electrodes $T_{2A}$ are changed from L to H, by means of a potential gradient which is produced by varying the potentials of the second transfer electrodes $T_{2A}$ and shift gate $SH_T$ to H at the same time, the signal charges can be transferred in parallel between the two transfer electrode lines.

Figure 12:
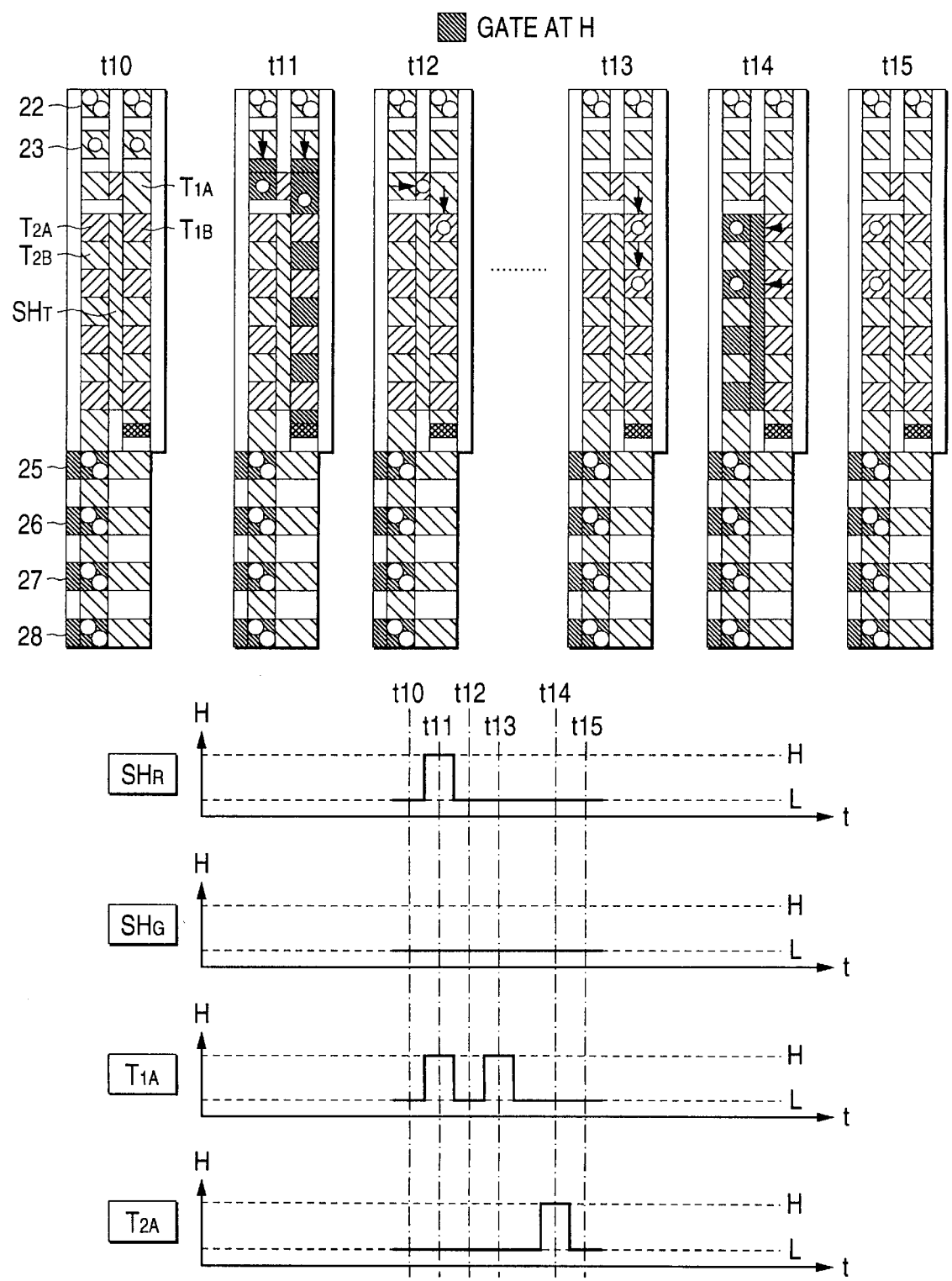
FIG. 12 is an explanatory view of the saving operation of the signal charges of R by the image sensor shown in FIG. 7.
Figure 13:
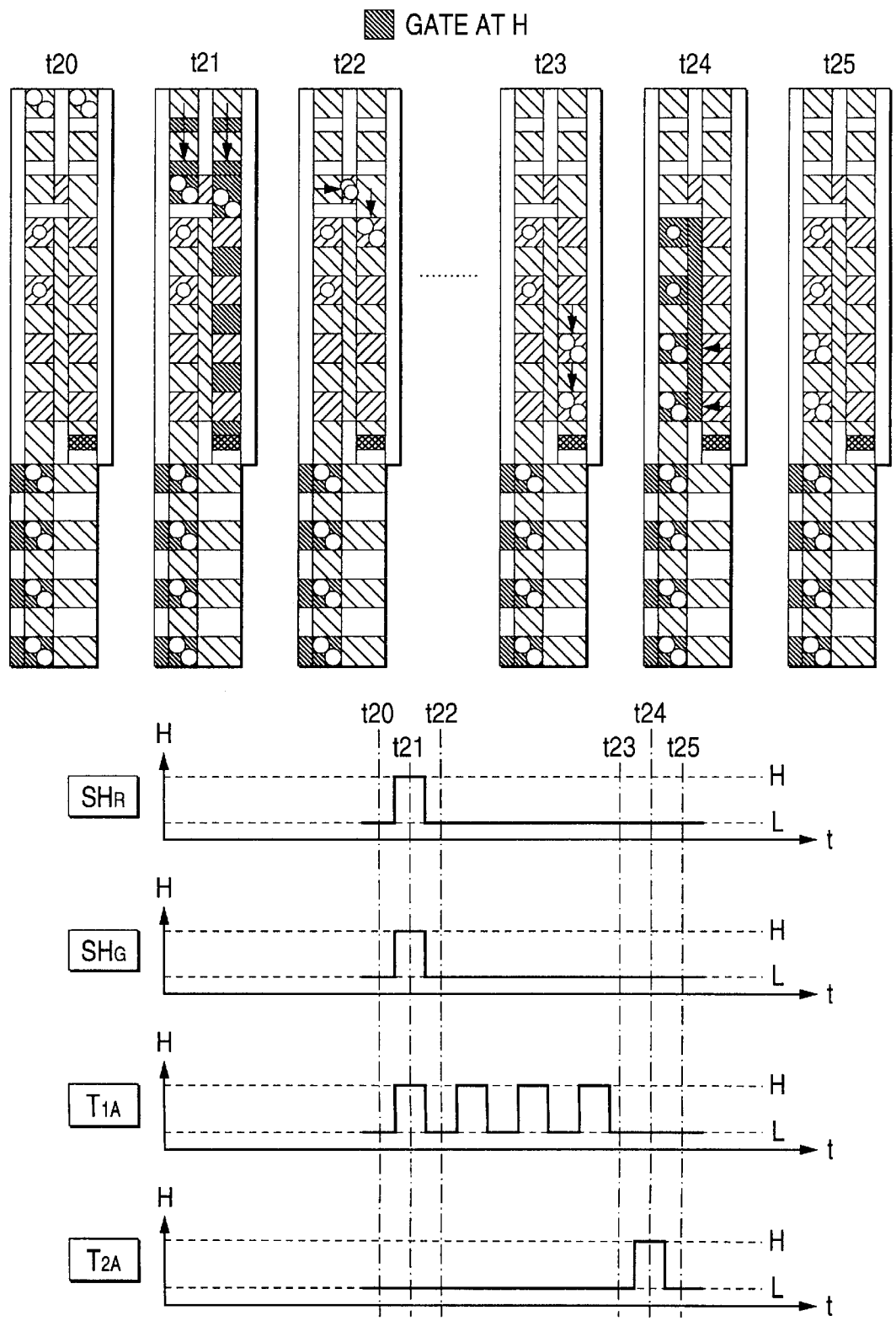
FIG. 13 is an explanatory view of an operation to read out the signal charges of G.
Figure 14:
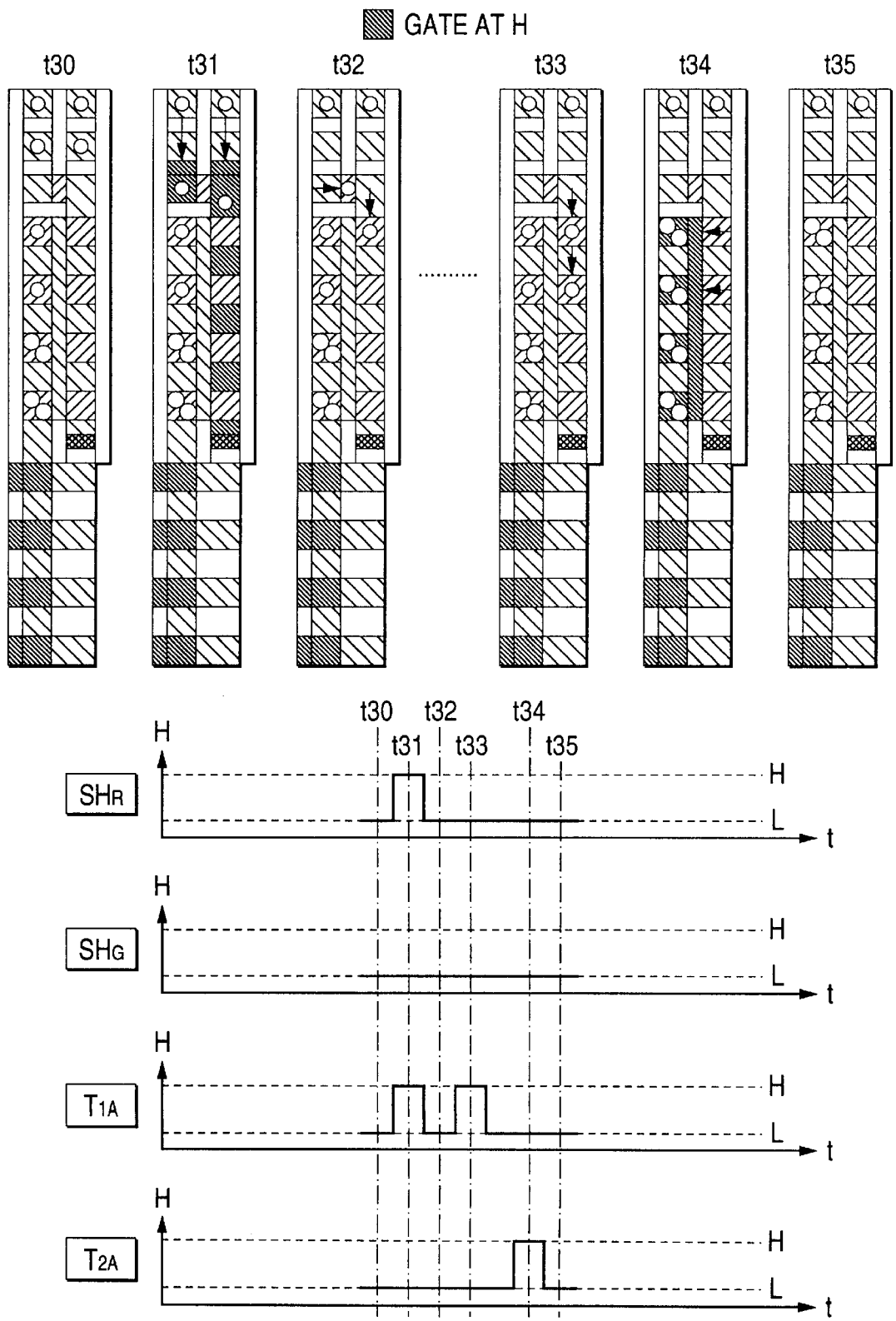
FIG. 14 is an explanatory view of an operation to read out the signal charges of R.
Figure 15:
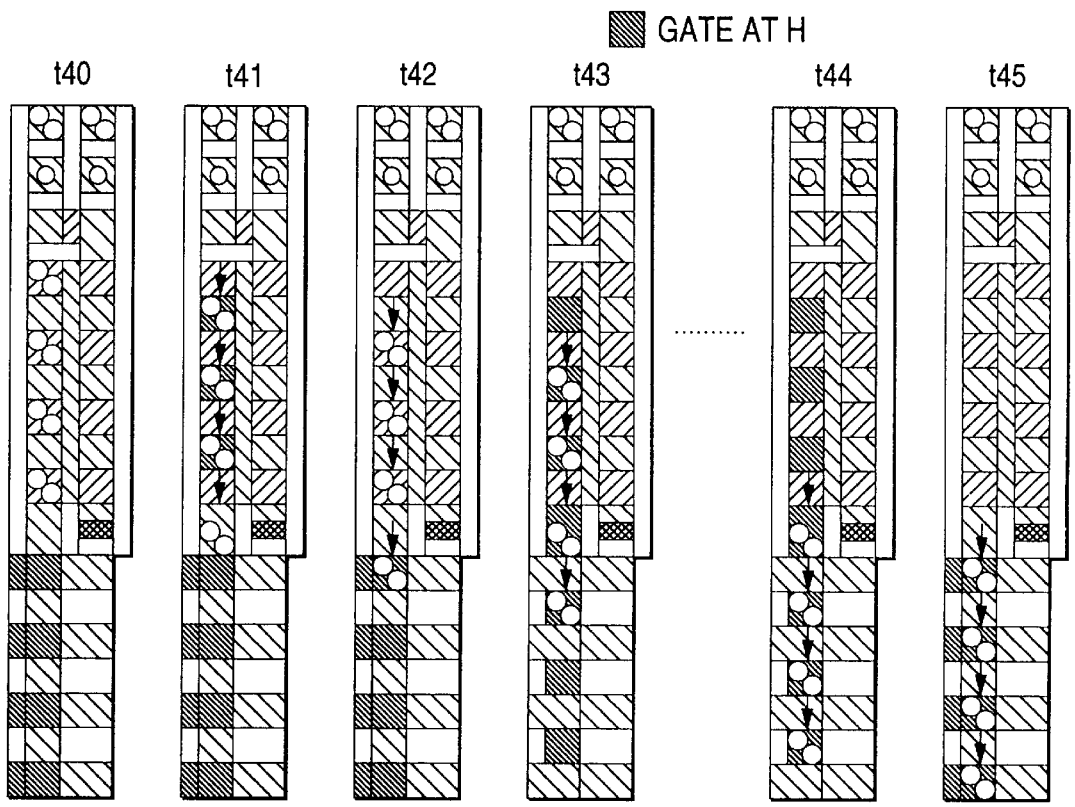
FIG. 15 is an explanatory view of an operation to transfer signal charges from a saving electrode to a horizontal transfer electrode.
Figure 15:
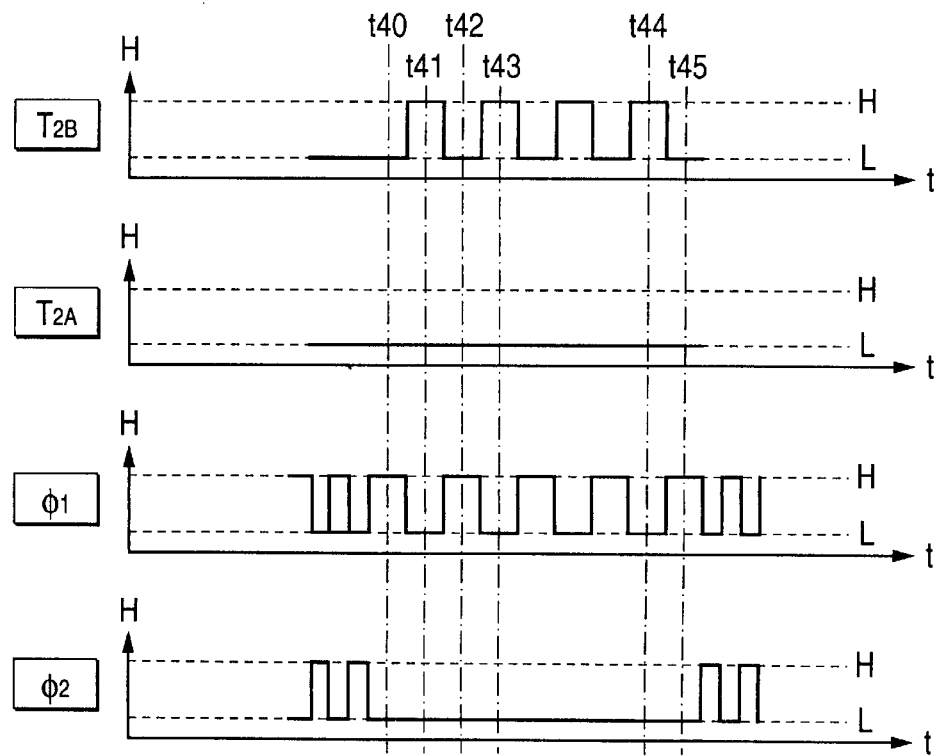

FIG. 12 is an explanatory view of the saving operation of R signal charges by the sensor shown in FIG. 7, FIG. 13 is an explanatory view of the read-out operation of G signal charges, FIG. 14 is an explanatory view of the read-out operation of R signal charges, and FIG. 15 is an explanatory view of a transfer operation from the saving electrode to the horizontal transfer electrode. In these figures, one circle designates a signal charge under exposure, while two circles stand for signal charges during one exposure period. Based on the operations of the above-mentioned respective detailed portions, a description will be given below of an operation to take out the signal charges during one exposure period of the G photosensitive pixel line 22 that is situated in the center of the three photosensitive pixel lines during the exposure period of the R photosensitive pixel line 23 that is the outside photosensitive pixel line of the three lines in an image sensor using an intra-pixel-line transfer system. By shifting the phases of the R and G exposure periods from each other in the following manner, when the sampling pitch in the sub-scanning direction varies in the zooming function of a digital copying machine, the three color registration correction can be made without lowering the resolution of the digital copying machine.

First, a description will be given below of how to take out the R signal charges during the exposure period with reference to FIG. 12. In FIG. 12, time t10 designates a state in which the exposure of G is ended and R is under exposure. If the exposure of G is completed, then, first, at time t11, by turning the R shift gate $SH_R$ and first transfer electrode line $T_{1A}$ to H, the signal charges of the two pixels of R can be transferred to the adjoining first transfer electrode line. Next, at time t12 and t13, the first transfer electrode line $T_{1A}$ is driven to vary in the order of L, H and L, while the signal charges of R are transferred sequentially through the first transfer electrode line $T_{1A}$ and reach the 4th stage/6th stage of the first transfer electrode line. Further, at time t14, by driving the second transfer electrode line $T_{2A}$ to H, the signal charges of R are transferred to the second transfer electrode line and, at time t15, by driving the second transfer electrode line $T_{2A}$, the signal charges of R are stored and held in the 1st stage/3rd stage of the second transfer electrodes.

Next, a description will be given below of how to take out the signal charges of G. In FIG. 13, time t20 shows the same state as time t15. First, at time t21, by driving the shift gate $SH_G$ of G, shift gate $SH_R$ of R and first transfer electrode line $T_{1A}$ to H respectively, the signal charges of G of two pixels are transferred through the interiors of the R photosensitive pixel line to the adjoining first transfer electrode line. At time t22 and t23, by driving the first transfer electrode line $T_{1A}$ to vary in the order of L, H, L, H, L, H and L, the signal charges of G are transferred through the first transfer electrode line sequentially and reach the 8th stage/10th stage of the first transfer electrode line. Further, at time t24, by driving the second transfer electrode line $T_{2A}$ to H, the signal charges of G are transferred to the second transfer electrode line and, at time t25, by driving the second transfer electrode line $T_{2A}$ to L, the signal charges of G are stored and held in the 5th stage/7th stage of the second transfer electrodes.

Next, a description will be given below of an operation to be performed at a time point when the remaining exposure of R is completed with reference to FIG. 14. In FIG. 14, time t30 shows a state in which the exposure of R after time t25 is continued and the signal charges are stored in the R pixel line. If the remaining exposure of R is ended, first, at time t31, by driving the shift gate $SH_R$ of R and first transfer electrode line $T_{1A}$ to H respectively, the signal charges of R of two pixels are transferred to the adjoining first transfer electrode line. Next, at time t32 and t33, by driving the first transfer electrode line $T_{1A}$ to vary in the order of L, H and L, the signal charges of R are transferred through the first transfer electrode line sequentially and reach the 4th stage/6th stage of the first transfer electrode line. Further, at time t34, by driving the second transfer electrode line $T_{2A}$ into H, the signal charges of R are transferred to the second transfer electrode line and are added to the signal charges of a first half section of the exposure period. At time t35, by driving the second transfer electrode line $T_{2A}$ to L, the signal charges of R are stored and held in the 1st stage/3rd stage of the second transfer electrodes. In this state, the signal charges of both R and G corresponding to one exposure period are stored in the second transfer electrodes.

Next, a description will be given below of an operation to deliver the signal charges stored in the second transfer electrodes to the horizontal transfer electrodes with reference to FIG. 15. In FIG. 15, time t40 shows a state in which, after the state of time t35, the signal charges of one line of the horizontal transfer electrodes have been read out completely. During a period of t41 to t45, by fixing the second transfer electrode lines $T_{2A}$ and $\phi2$ at L respectively and also by driving the second transfer electrode lines $T_{2B}$ and $\phi1$ in the mutually opposing phases, the signal charges are sequentially transferred and are then set at the respective positions of the four lines of horizontal transfer electrodes.

These operations are performed in parallel in all pixels, for example, in a sensor including three lines and 5,000 pixels, 2,500 systems each having a set of two pixels are operated in parallel.

As described above, with use of a sensor structure according to the present embodiment, by performing the operations shown in FIGS. 12 to 15 sequentially, in an image sensor of an intra-pixel-line transfer system, the exposure phases of the respective read lines can be made to differ from each other.

In this operation, the second transfer electrode line serves as the saving and storage electrode, the signal charges of R under exposure are read out into the second transfer electrode line, and the signal charges of G are read out into positions nearer to the horizontal transfer electrode than the R signal charges in the second transfer electrode line, while the G signal charges get ahead of the R signal charges. That is, since this operation is performed in such a manner as if an express train passed (through the first transfer electrode line) a local train on a sidetrack (the second transfer electrode line), the order of reading out signal charges from the photosensitive pixel lines and the order of transferring those to the horizontal transfer electrodes can be changed. Signal charges of R produced during the remaining exposure period are read out later after completion of the exposure period and are combined with the signal charges of R produced during the first half of the exposure period, so that the combined charges are signal charges that correspond to one exposure period.

As described above, according to the structure shown in FIG. 7 as well, similarly to the structure shown in FIG. 1, it is possible to adjust an exposure timing in an image sensor of an intra-pixel-line system and, by increasing the number of stages of the first and second transfer electrode lines, the present structure can cope with even a case in which the number of lines of horizontal transfer electrodes is increased.

According to the second embodiment, there is employed a sensor including a total of four systems of horizontal transfer electrodes in which the two colors R and G respectively include two even and odd systems. However, the invention can also apply to a sensor of a type that signal charges corresponding to the three colors R, G and B are taken out on one side thereof and also that it includes a total of 6 systems of horizontal transfer electrodes in which the three colors R, G and B respectively include two even and odd systems. Further, the invention can similarly apply to a sensor of a type that, in order to cope with high speeds, it includes four systems for each color and thus a total of eight systems for the two colors.

Figure 16:
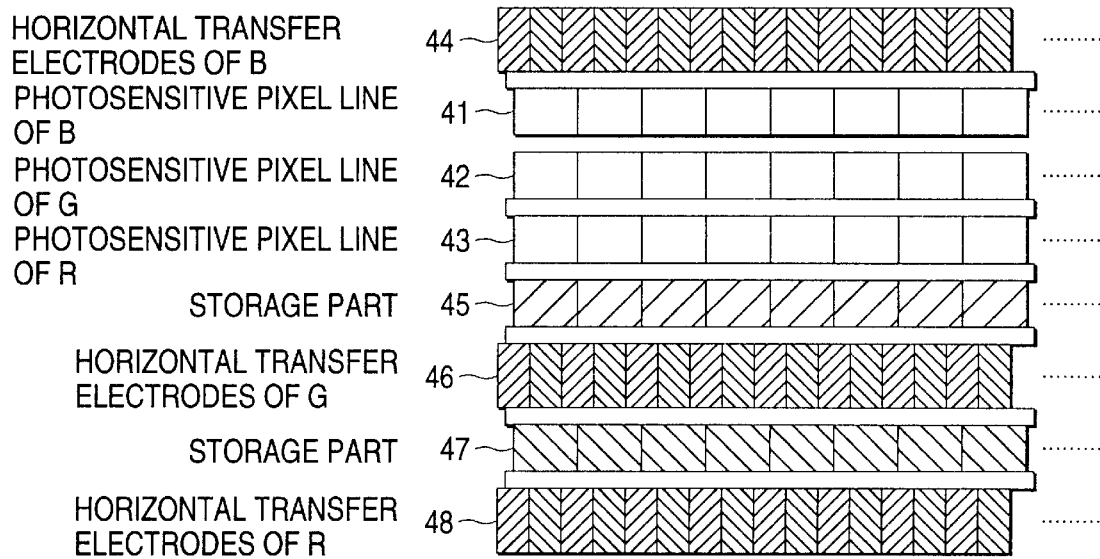
FIG. 16 is an explanatory view of a third embodiment of an image sensor having a storage part according to the invention.

Next, a description will be given below of a third embodiment of an image sensor according to the invention. FIG. 16 is an explanatory view of the structure of the third embodiment of an image sensor including a storage part according to the invention, and FIG. 17 is an explanatory view of the structure of the main portions of the present image sensor.

The image sensor shown in FIG. 16 is structured such that, out of signal charges stored in the photosensitive pixel lines 41 to 43 of three colors R, G and B which are respectively shown in the upper portion of FIG. 16, the signal charges of the two colors R and G can be read out in a downward direction in FIG. 16, and that signals are transferred to two systems of horizontal transfer electrodes 46 and 48 each consisting of one system for each color (which serve to read out signal charges of one line by converting those into a time-series signal) through storage parts 45 and 47.

Figure 17:
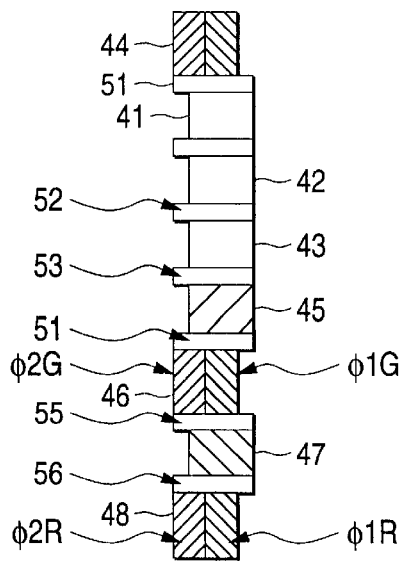
FIG. 17 is an explanatory view of the structure of the image sensor shown in FIG. 16.

Concretely, as in FIG. 17 which shows one block of the present image sensor, there is interposed between the photosensitive pixel 42 of G and the photosensitive pixel 43 of R a shift gate 52 which is used to transfer the signal charges of G and, between the photosensitive pixel 43 of R and a storage part 45, there is interposed a shift gate 53 which is used to transfer not only the signal charges of R but also the signal charges of G transferred through the shift gate 52 to the R photosensitive pixel 43. Out of the signal charges of G and R transferred from the photosensitive pixels 42 and 43 to the storage electrode of the storage part 45, the signal charges of G are guided through a shift gate 54 to the horizontal transfer electrode 46 of G; and, the signal charges of R are guided through a shift gate 54 to the horizontal transfer electrode 46 of G, after then, the signal charges are further guided through a shift gate 55 to the storage electrode of a storage part 47 and are still further guided through a shift gate 56 to the horizontal transfer electrode 48 of R. And the signal charges of G guided to the horizontal transfer electrode 46 by means of the above operations are converted to time series signals and are then read out by the horizontal transfer electrodes of φ1G and φ2G, while the signal charges of R guided to the horizontal transfer electrode 48 of R are converted into time series signals and are then read out by the horizontal transfer electrodes of φ1R and φ2R.

Figure 18:
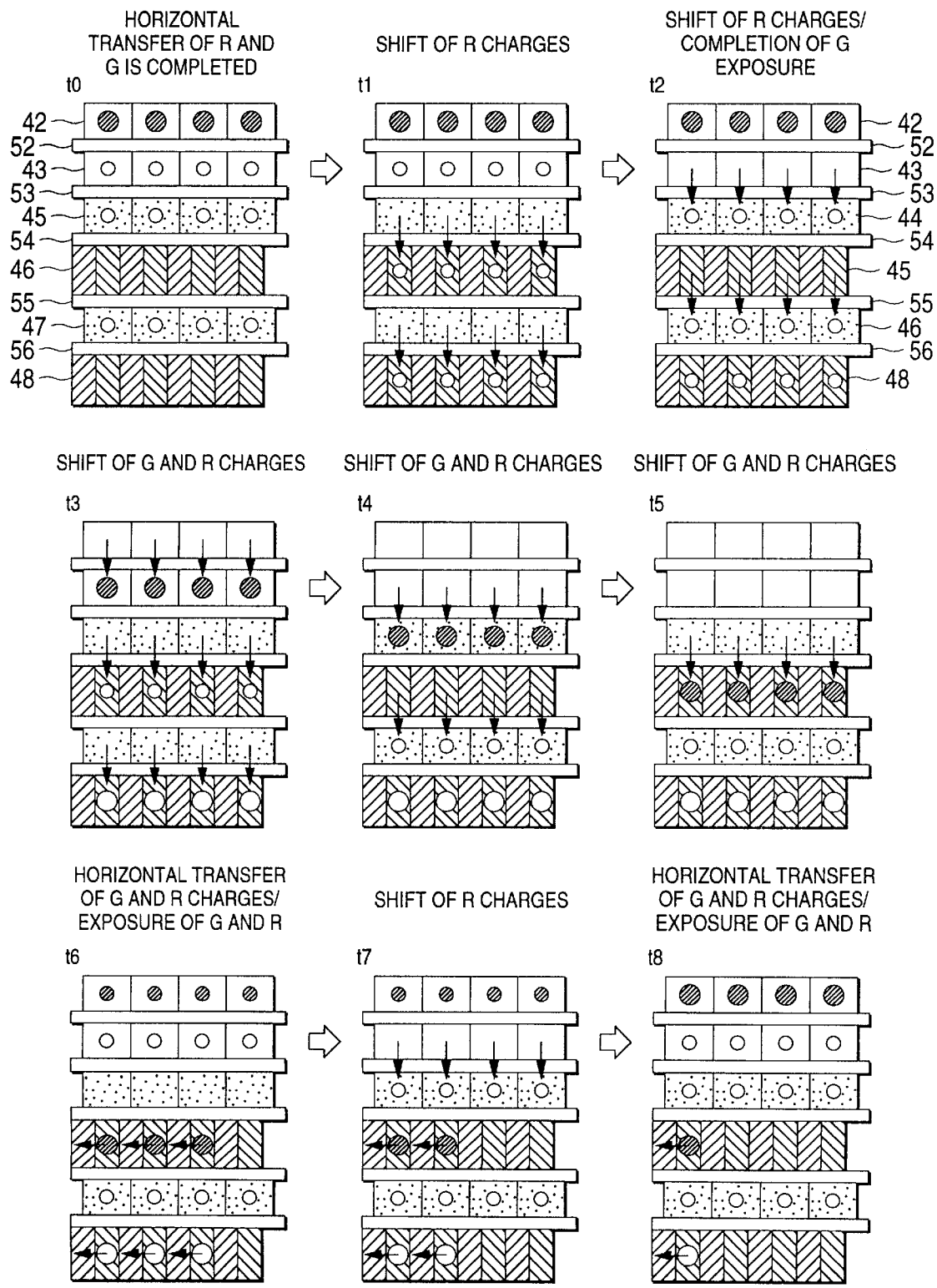
FIG. 18 is an explanatory view of an operation to read out the signal charges of G through the pixels of R while R is being exposed after the exposure of G is completed.
Figure 19:
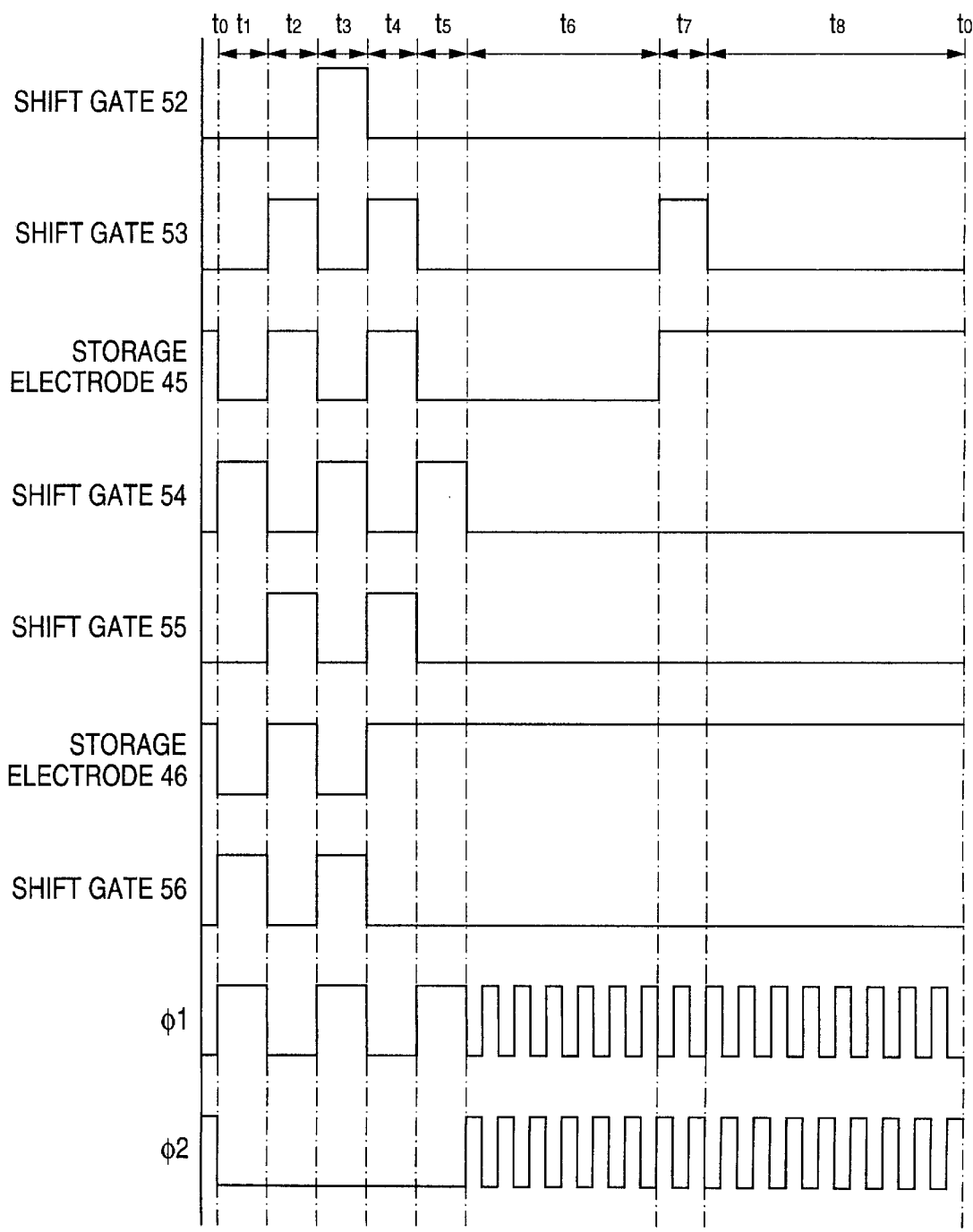
FIG. 19 is a timing chart of drive voltage signals to be applied to the respective electrodes of the image sensor when the signal charges are read out.

FIG. 18 is an explanatory view of an operation to read out the signal charges of G during the exposure of R through the pixel of R after the exposure of G is ended, and FIG. 19 is a timing chart of drive voltage signals to be applied to the respective electrodes when the charges are read out.

Next, a description will be given below of an effect obtained due to provision of the storage parts 45 and 47 in a passage through which the signal charges are transferred from the photosensitive pixels 42 and 43 using an intra-pixel-line transfer system in the image sensor having the above-mentioned structure. In the image sensor of an intra-pixel-line transfer system as well, in order to shift the exposure timings of the respective colors, at the time of completion of the exposure corresponding to one line of the centrally situated read photosensitive pixel line (in the present embodiment, G), the signal charges are read out through the interior of the other read photosensitive pixel line (in the present embodiment, R) under exposure.

In FIG. 18, time t0 stands for a timing when the horizontal transfer of the signal charges of G is completed. At this time, the exposure of the photosensitive pixel line of G is almost completed, while the photosensitive pixel line is on the way of the exposure period thereof. First, during period t1, if the shift gates 54 and 56 are turned on, then the signal charges of R within the storage part 45 as well as the signal charges of R within the storage part 47 are moved in the potential increasing direction along the potential gradient, so that they are respectively transferred to φ1G of the horizontal transfer electrode 46 of G and φ1R of the horizontal transfer electrode 48 of R. Next, during period t2, if the shift gates 53 and 55 are turned on, then the signal charges of R within the photosensitive pixel line 43 of R and the signal charges of R within φ1G of the horizontal transfer electrode 46 of G are respectively transferred to the storage parts 45 and 47. After period t2, the exposure of the photosensitive pixel line 42 of G is ended completely.

Next, during period t3, if the shift gates 52, 54 and 56 are turned on, then the signal charges of G within the photosensitive pixel line 42 of G are transferred to the photosensitive pixel line 43 of R, the signal charges of R within the storage part 45 are transferred to φ1G of the horizontal transfer electrode 46 of G, and the signal charges of R within the storage part 47 are transferred to φ1R of the horizontal transfer electrode 48 of R. In this operation, in φ1R of the horizontal transfer electrode 48 of R, the signal charges of R just before the signal charges transferred during period t1 are combined with the signal charges of R transferred during period t3. Next, during period t4, if the shift gates 53 and 55 are turned on, then the signal charges of G within the photosensitive pixel line 43 of R are transferred to the storage part 45, while the signal charges of R within φ1G of the horizontal transfer electrode 46 of G are transferred to the storage part 47. Further, during period t5, if the shift gate 54 is turned on, then the signal charges of G within the storage part 45 are transferred to φ1G of the horizontal transfer electrode 46 of G.

By the above-mentioned series of operations, the signal charges of G that have been exposed completely during one exposure period can be transferred through the photosensitive pixel line of R under exposure, and the signal charges of R stored during another exposure period different from the exposure period of G can be transferred in part, so that they can be moved to the G and R horizontal transfer electrodes 46 and 48 respectively. During period t6, the horizontal transfer of the respective signal charges is started by the G and R horizontal transfer electrodes 46 and 48. Next, during period t7, if the shift gate 53 is turned on while the signal charges are under horizontal transfer, then the signal charges of R stored within the R photosensitive pixel line 42 during periods t5 and t6 can be transferred to the storage part 45. Further, during period t8, the respective signal charges of the G and R horizontal transfer electrodes 46 and 48 are transferred in the horizontal direction by these electrodes 46 and 48, thereby completing the remaining horizontal transfer.

As described above, the storage parts 45 and 47 are respectively interposed between the photosensitive pixel lines 42 and 43 and the horizontal transfer electrodes 46 and 48, and the signal charges of R under exposure are temporarily held in the storage parts 45 and 47 to thereby secure a transfer passage for transferring the signal charges of G after the exposure thereof are completed, which makes it possible to read out the signal charges of G through the interior of the photosensitive pixel of R under exposure. Here, by controlling the allocation of periods t6 and t8 which determines timing of period t7, in a two-or-more line color sensor of an intra-pixel-line transfer system, the mutual exposure phase timings can be shifted from one another, which has been difficult according to the prior art. Due to this, in a digital color copying machine, when the scanning density in the sub-scanning direction is changed in the magnification varying mode of the copying machine, it is possible to prevent the color registration correction performance of the copying machine from being lowered. Also, since the registration correction of decimal portions can be made with high accuracy, there is eliminated the need that the gap between the photosensitive lines is an integer multiple of the pixel pitch, which makes it possible to set the gap between the pixel lines for less than 2 lines (for example, 1.5 lines).

Figure 20:
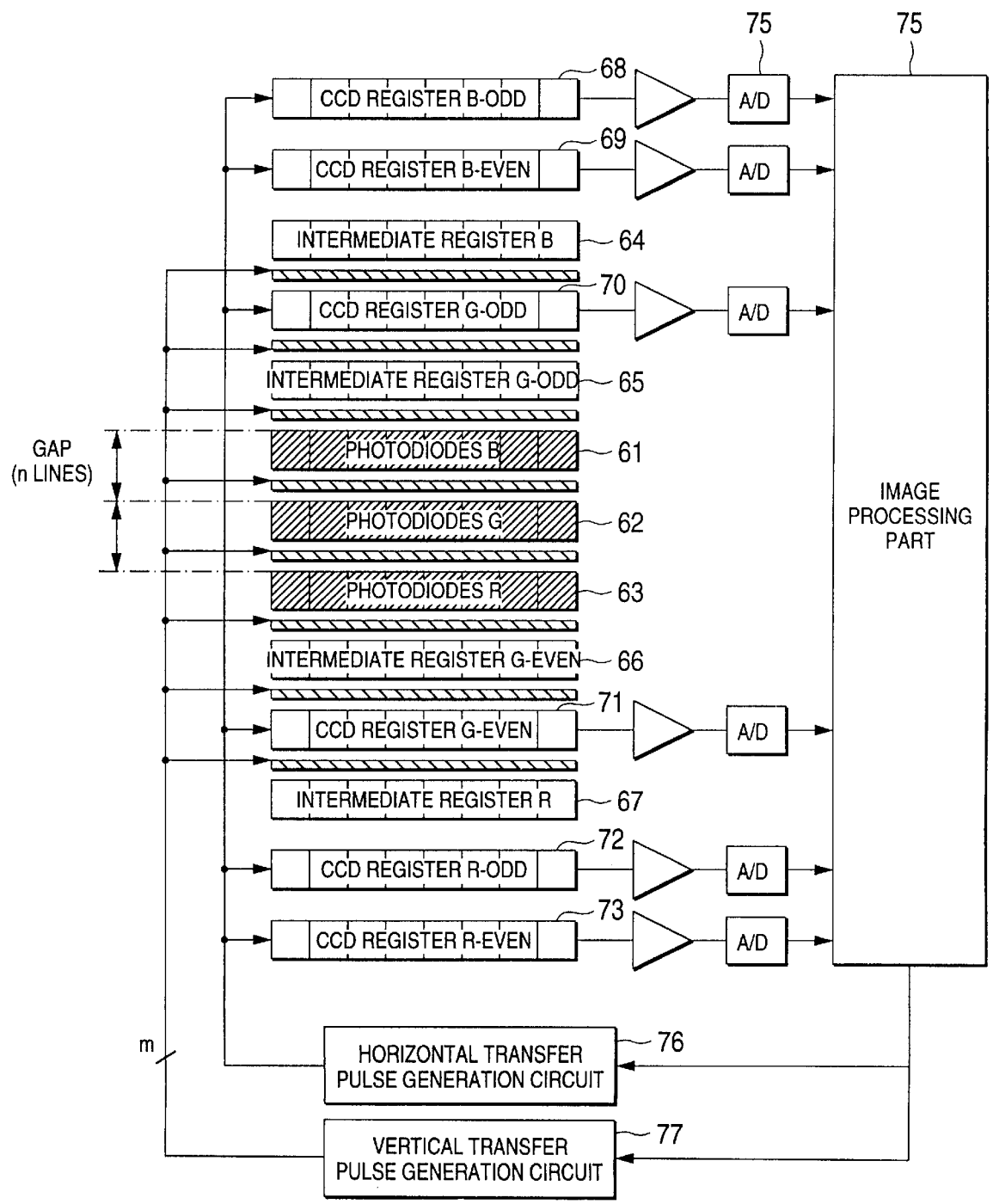
FIG. 20 is a block diagram of a fourth embodiment of an image sensor having a storage part according to the invention.

Next, a description will be given below of a fourth embodiment of an image sensor according to the invention. FIG. 20 is a block diagram of the structure of the fourth embodiment of an image sensor including a storage part according to the invention. The image sensor shown in FIG. 20 is a full-color CCD which includes three photosensitive pixel lines 61–63, while the three photosensitive pixel lines 61–63 have sensitivities with respect to the wavelengths of three colors B, G and R respectively. Each of the three photosensitive pixel lines 61–63 is divided into 2 channels consisting of an odd pixel (which is hereinafter referred to as Odd) and an even pixel (which is also hereinafter referred to as Even), and thus the present full color CCD includes an output consisting of a total of 6 channels. In the present embodiment, as regards the photosensitive pixel line 61 of B, both Odd and Even are transferred to the B photosensitive pixel line 61 side and, as regards the photosensitive pixel line 62 of G, only Odd is transferred to the B photosensitive pixel line 61 side, while CCD registers 68–70 for horizontal transfer are also provided on the same side. Also, as regards the Odd and Even of the R photosensitive pixel line 63 as well as the Even of the G photosensitive pixel line 62, their respective CCD registers 71–73 for horizontal transfer are provided on the R photosensitive pixel line 63 side. And an intermediate registers 64 of B and an intermediate register 65 of G-Odd, which are capable of transferring signal charges bi-directionally in the vertical direction, are disposed on the B photosensitive pixel line 61 side. Similarly, an intermediate register of R and an intermediate register 66 of G-Even are disposed on the R photosensitive pixel line 63 side.

Figure 21:
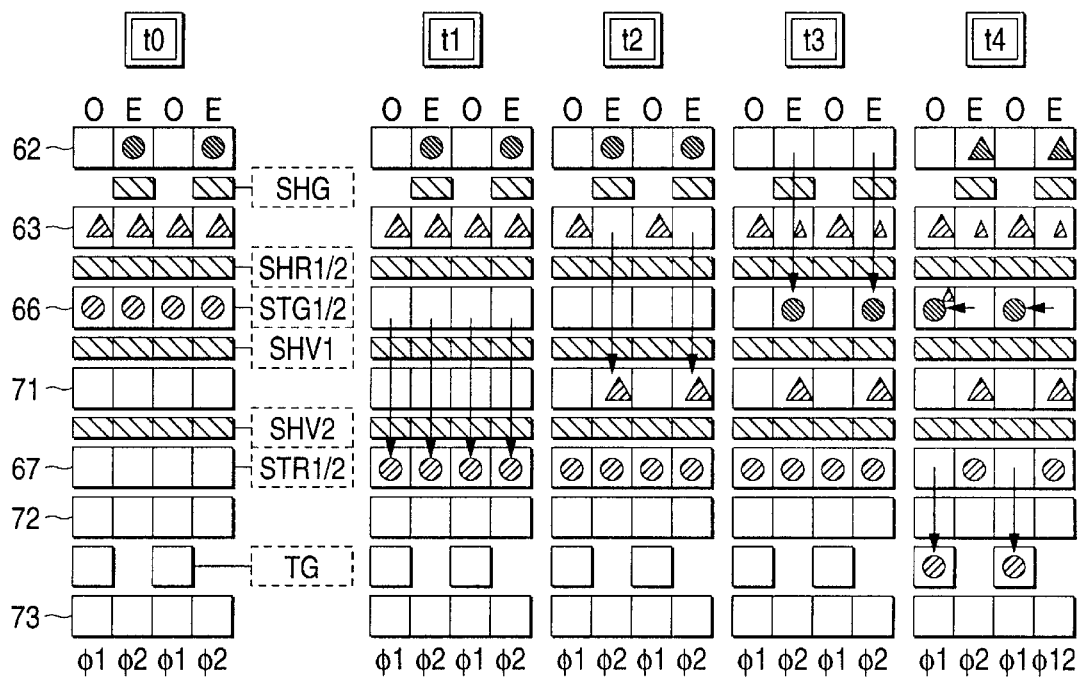
FIG. 21 is a plane structure view of four pixels of the image sensor shown in FIG. 20.
Figure 22:
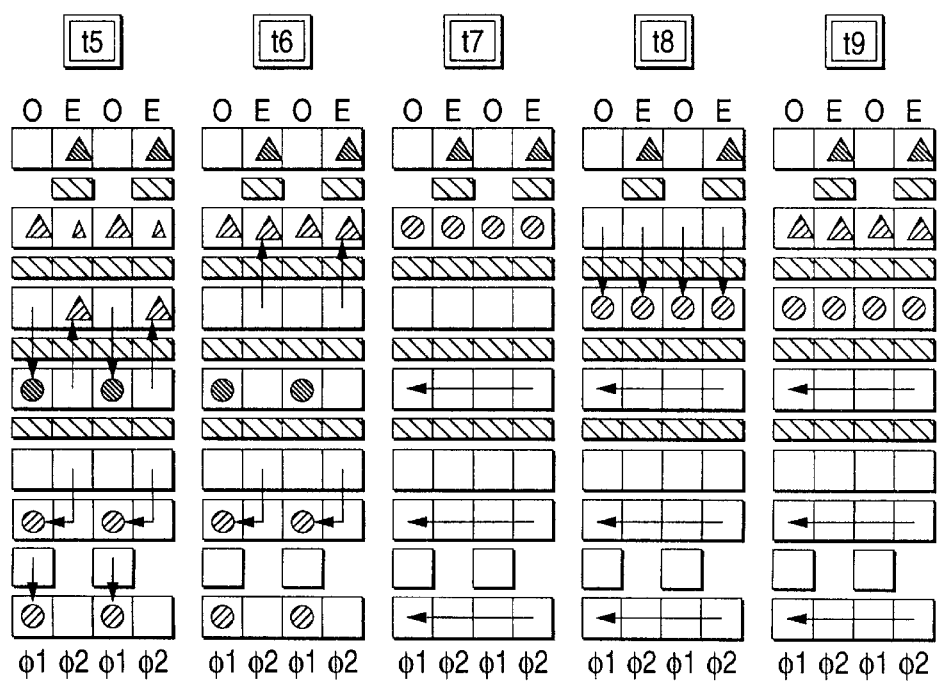
FIG. 22 is a plane structure view of four pixels of the image sensor shown in FIG. 20.
Figure 23:
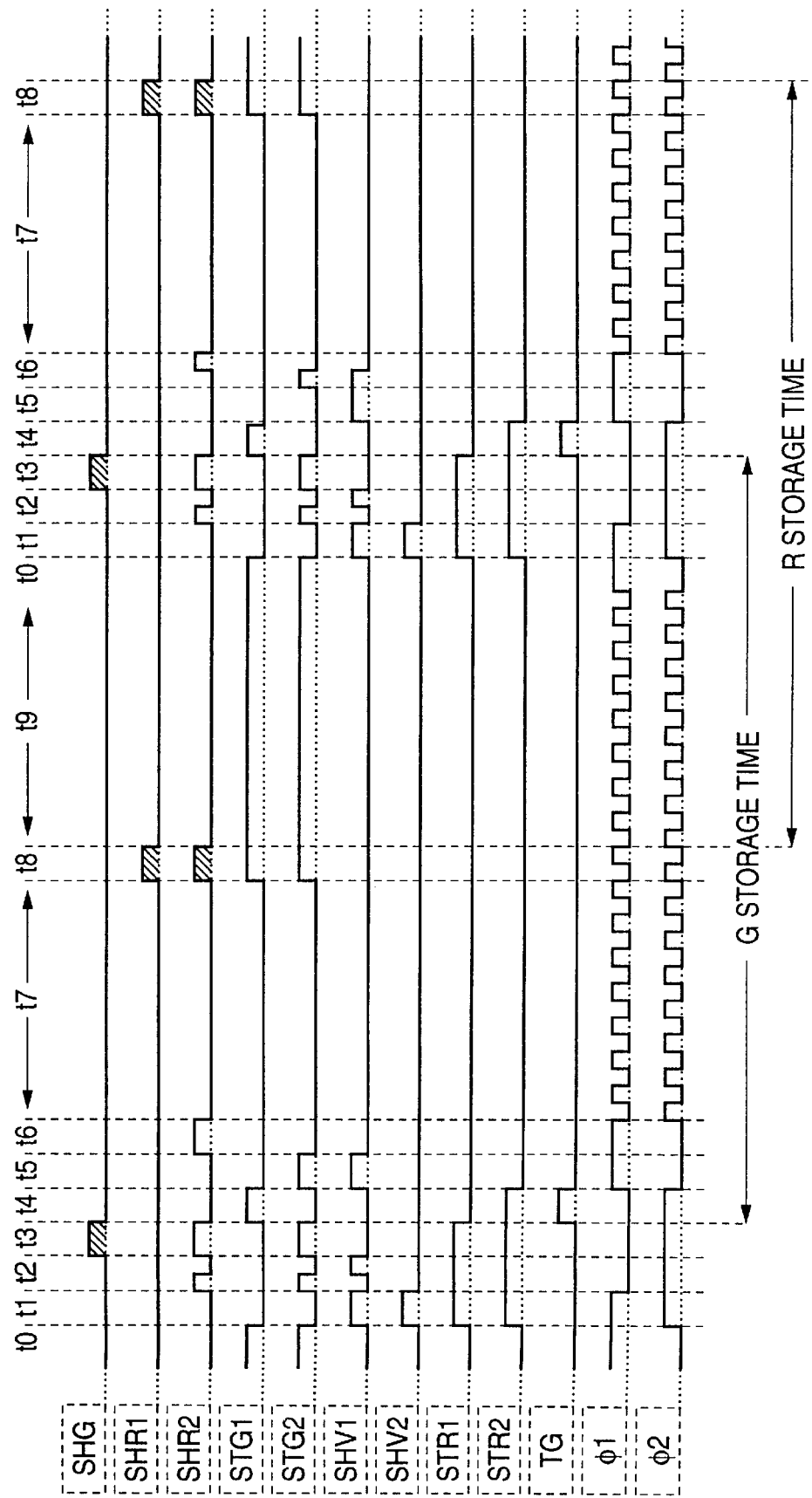
FIG. 23 is a time chart of the operation timings of the respective electrodes.

Next, a description will be given below of a specific structure and operation timings of the present embodiment with reference to FIGS. 21–24. FIGS. 21 and 22 respectively show plane structures of a four-pixel portion of the image sensor shown in FIG. 20, in which only the G-Even/R photosensitive pixel line side of the image sensor is shown. In these figures, a circle and a triangle respectively indicate signal charges accumulated, and as the signal charges increase, the mark changes in the order of a small triangle, a large triangle, and a circle. Signal charges are accumulated similarly in the Green-Odd pixels, but a description thereof will be omitted to avoid unduly complicating the figures. Circles, triangles, and arrows show movement of signal charges at time t0–t9. Reference characters SHG, SHR1/2 and the like are control lines which are used to drive the respective gate electrodes that are shown in these figures, while $\phi 1$ and $\phi 2$ are respectively $2\phi$ clock control lines which can be used in common for the respective horizontal transfer CCD registers of G-Even, R-Odd and R-Even. Here, FIG. 23 is a time chart which shows the operation timings of the respective electrodes, and the above-mentioned respective control lines are used to generate and control pulses at the timings shown in the time chart.

First, time t0 shows a moment when the signal charges of an (n−1)th line in the sub-scanning direction have all passed through the horizontal transfer CCD registers 71–73. At this time, the exposure time of the R signal charges of an nth line has already been ended and the R signal charges are held in the G intermediate register 66. At time t1, by driving all of the gate electrodes SHV1, SHV2 and SHV1/2 to H, the R signal charges of the nth line can be transferred along a potential gradient to the intermediate register 67 of R. At time t2, the exposure time of the G signal charges of the nth line is just ended but, since the R signal charges of an (n+1)th line are already under exposure at this time, the signal charges of R-Even of the (n+1)th line are saved temporarily in order to pass the signal charges of G-Even. In this case, by driving the gate electrodes SHR2, STG2 and SHV1 to H, the signal charges of R-Even can be transferred to the horizontal transfer CCD register 71 of G-Even. Next, by driving the gate electrodes SHG, SHR2 and STG2 to H at time t3, the signal charges of G-Even of the nth line can be transferred to the intermediate register 66 of G.

At time t3, following the temporary saving of the signal charges of R-Even, the signal charges of G-Even pass through the R photosensitive pixel and, therefore, the signal charges of G produce a mixed color for the R photosensitive pixel. The degree of the mixed color is determined by a ratio of a pulse width at time t3 with respect to the read cycle Ts of one line of the CCD. Normally, since the pulse width at time t3 is 1–2 $\mu$sec, while the cycle Ts is in the order of 400 $\mu$sec even in a high-speed copying machine, the mixed color ratio is in the order of 0.25–0.5%, which has little influence on the quality of an image formed. Also, in order to reduce the influence of a mixed color, for example, in the case of an RGB system, B may be allotted to the intermediate pixel line of the three photosensitive pixel lines. This is because the color B is least sensitive when it is measured according to a spectral luminous efficiency for the human eyes, that is, hard to perceive. In addition, in the case of a copying machine, a Y (yellow) signal (Y is a complementary color to B) is produced from a B signal, and the color Y is also less sensitive to the human eyes and is not noticeable.

Next, at time t4, the signal charges of G-Even of the nth line are transferred to the $\phi 1$ side of the intermediate register 66. In this case, the R-Even signal charges are transferred to TG so that the R signal charges of the nth line that have been continuously held in the intermediate register 67 of R since the time t0 can be distributed to the Odd/Even $2\phi$ signals.

At time t5 and t6, the signal charges of R-Even that have been saved and are being exposed are returned back to the photosensitive pixel line 63 of R and, at the same time, the G-Even signal charges of the nth line are transferred to the horizontal transfer CCD register 71 of G-Even. Here, the reverse transfer of the signal charges is carried out, that is, the signal charges are transferred reversely from the horizontal transfer CCD register 71 of G-Even to the intermediate register 66 of G-Even as well as from the intermediate register 66 of G-Even to the photosensitive pixel line 63 of R. This reverse transfer will be discussed in detail afterwards. Also, the R signal charges of the nth line are also distributed into Odd and Even and are then transferred to the respective $\phi 1$ sides of Odd and Even, respectively.

At time t7, $\phi 1$ and $\phi 2$ start their complementary drive operations and the signal charges of G-Even of the nth line as well as the signal charges of R-Odd and R-Even of the nth line start to be transferred in the horizontal direction at the same time and with the same phase. At time t8, since the exposure period of R of the (n+1)th line is ended, by driving the gate electrode SHR1/2 to H, the R signal charges of the (n+1)th line are transferred from the R photosensitive pixel line 63 to the intermediate register 66 of G. At this time, in the G photosensitive pixel line 63, the signal charges of the (n+1)th line are still in the exposure period. At time t9, in the R photosensitive pixel line 63, the exposure period of an (n+2)th line is already started and thus the operation as it is returned to the state of time t0.

As the operation sequence of the present image sensor has been described so far, basically, the exposure time zone of G is determined by time t3, while the exposure time zone of R is determined by time t8. Since the pulse intervals from t3 to t8 can be changed arbitrarily and continuously, even if there occurs a decimal portion as shown in Table 1 in connection with the reduction/enlargement magnification in the registration correction between the R, G and B, an ideal correction is possible without using the weight mean thereof. Also, the output signals from the horizontal transfer CCD registers 71–73 are always output at the same time and at the same timing in all channels from t7 to t9 regardless of the above-mentioned pulse intervals from t3 to t8. This eliminates the need for provision of an output delay circuit and the like which are conventionally necessary to perform an image processing in the later stage, which makes it possible to realize a structure that is easy to use and inexpensive.

Figure 24:
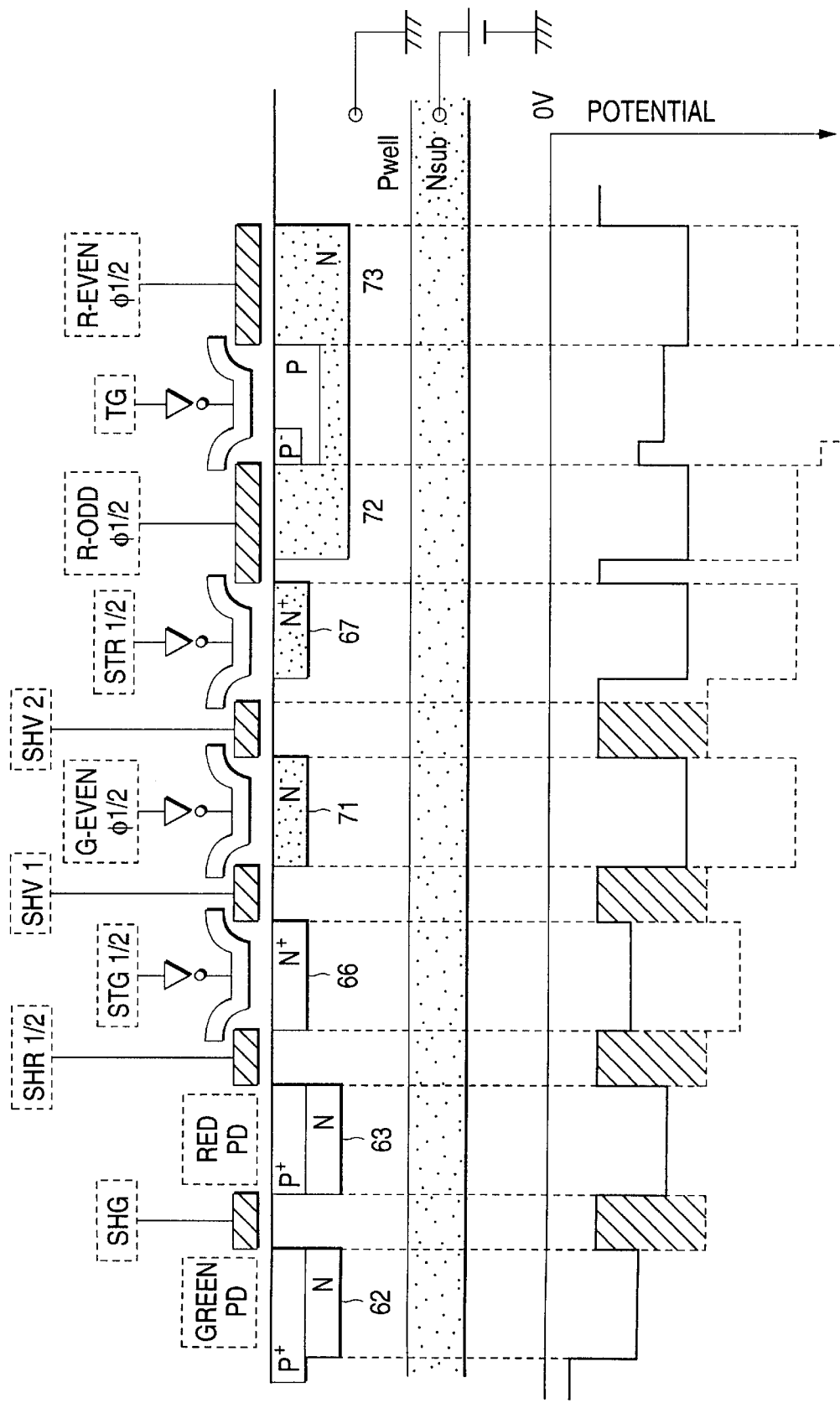
FIG. 24 is a vertical direction section view of a register per pixel formed on an N-type Si substrate and electric field potentials in the respective parts of the register.

Next, a description will be given below of the internal structure of a register which is structured so as to perform the above-mentioned transfer operation in both directions. FIG. 24 is a vertical direction section view of a register formed on an N-type Si substrate and corresponding to one pixel, in which the electric field potentials of the respective parts of the register are also shown. In this electric field potential view, a solid line designates a case in which a voltage to be applied to the respective gate electrodes is of a L (low) level, and a dotted line stands for a case in which the applied voltage is set in the H level and the potentials are lowered. As the polarity of the signal charge, an electron carrier dominates, that is, the polarity of the signal charge is a negative polarity and, in FIG. 24, the signal charge always flows in a positive direction in which the potential is lowered. A register, which is arranged so as to perform the transfer operation in both directions, is located just below the gate electrode STG1/2 and, with the potential level thereof set in the applied voltage L level, the register is situated in the more negative direction than the adjoining photosensitive pixel line (Red PD) 63 and the horizontal CCD register 71 of G-Even. This potential level at the applied voltage L level depends on the thickness or impurity density of an N layer formed within a P-well in FIG. 24. The potential level of an N-type semiconductor becomes an $N^-$ type and is thus increased in level by increasing the impurity density thereof, while it becomes an $N^+$ type and is thus decreased in level by decreasing the impurity density thereof. Therefore, in the present embodiment, other registers are formed as $N^-$, whereas the intermediate register 66 of G-Even just below the gate electrode STG1/2 is formed as $N^+$. As a result, a potential which is one stage higher in level than the adjoining registers can be formed just below the gate electrode STG1/2.

Where a signal charge is present just below the gate electrode STG1/2, if an H level is applied to the gate electrode SHR1/2, then the level thereof is lowered and the signal charge is thereby transferred to the photosensitive pixel line (Red PD) 63 side. Also, if an H level is applied to the gate electrode SHV1, then the level thereof is lowered, so that the signal charge can be transferred to the horizontal transfer CCD register 71 side of G-Even. That is, by selecting the gate electrode to which the H level is applied, the direction of the vertical transfer can be selected. Also, if the gate electrodes STG1/2 and SHV1 are set in the H level and G-Even is set in the L level, then the transfer of the signal charge from the horizontal transfer CCD register 71 of G-Even to the intermediate register 66 side of G-Even is also possible.

As has been described above, by combining the structure shown in FIG. 24 with the operation sequence shown in FIGS. 21 to 23, in a three-line CCD of an intra-pixel-line transfer system, operations such as the temporary saving of the outside signal charges, the passage of the inside signal charges and the like are possible.

Figure 25:
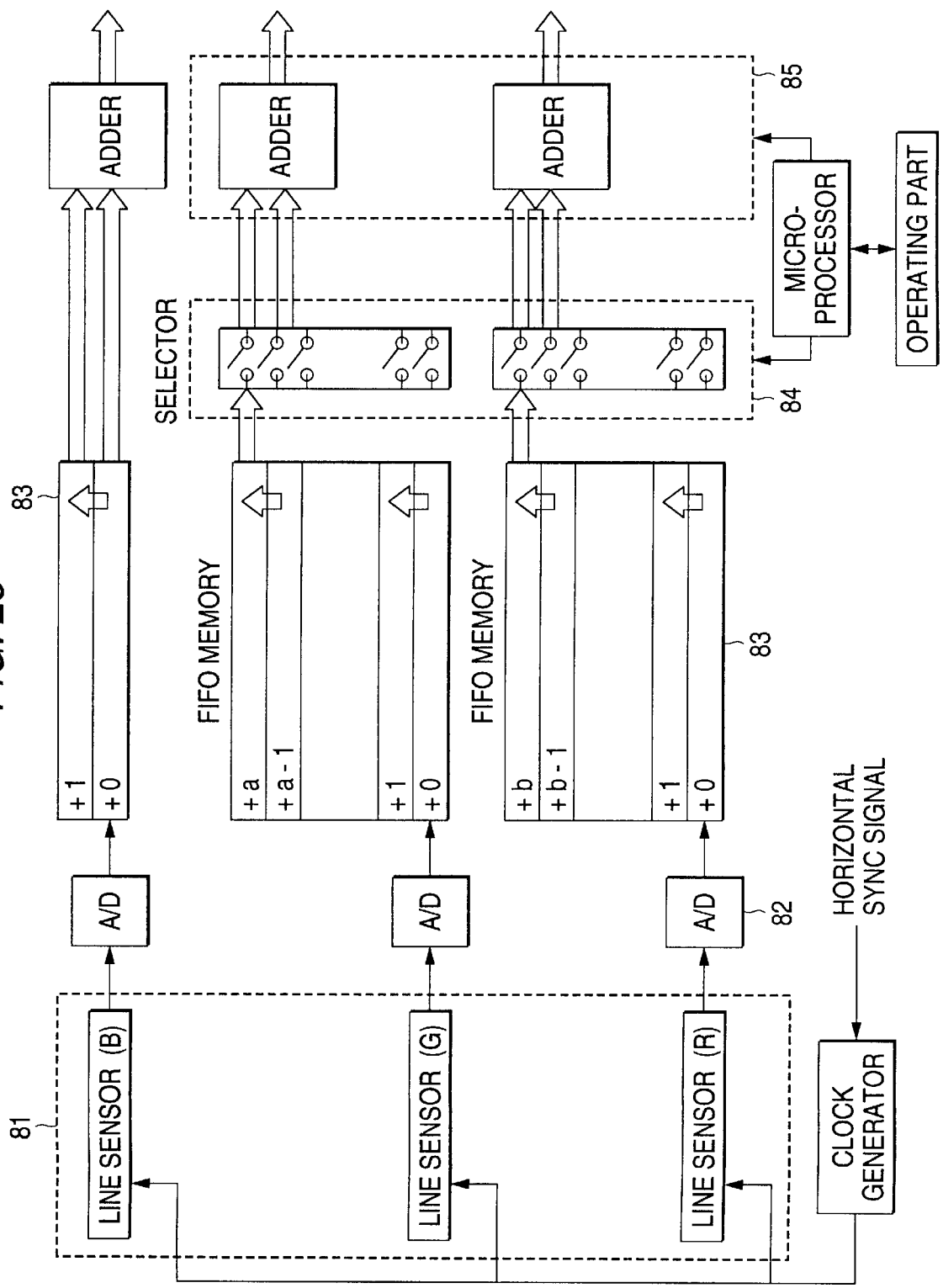
FIG. 25 is a block diagram of a structure in which a registration correction is made by use of a combination of an image sensor and a FIFO.
Figure 26:
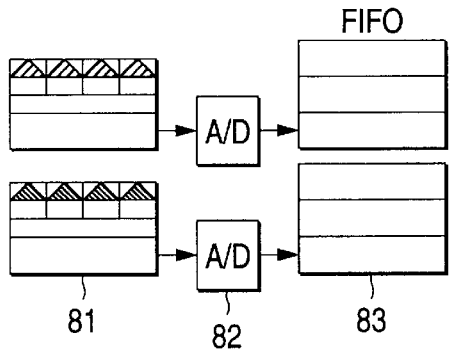
FIG. 26 is an explanatory view of the operation of a circuit shown in FIG. 25.
Figure 26:
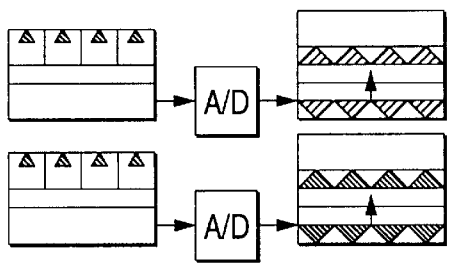
Figure 26:
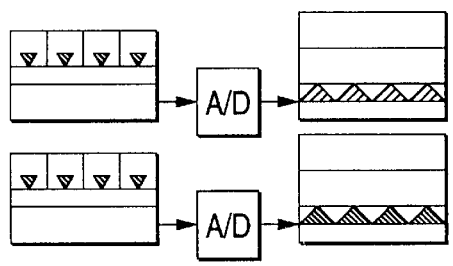
Figure 26:
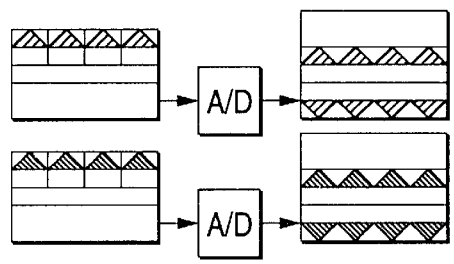
Figure 26:
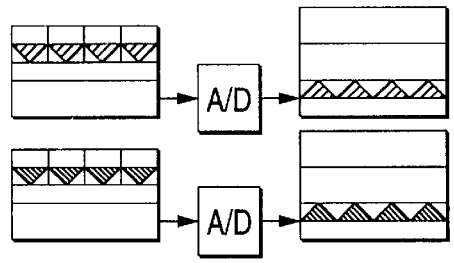
Figure 26:
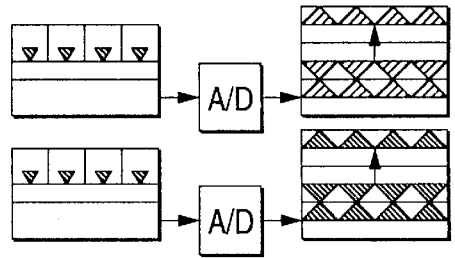
Figure 26:
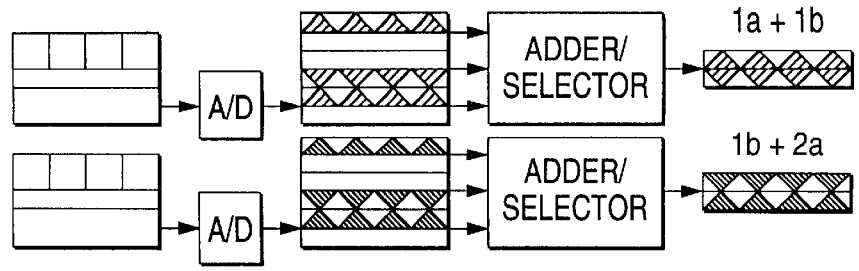

FIG. 25 is a block diagram of a configuration which makes a registration correction by a combination of an image sensor with a FIFO memory, and FIG. 26 is an explanatory view of the operations of circuits shown in FIG. 25. In the example shown in FIG. 25, the drive cycle of a line sensor 81 is made ½ of a one-line period specified by a horizontal cycle signal, the line data corresponding to a ½ line is read out two times in a period that is originally a period for reading out line data corresponding to one line. That is, the information corresponding to one line in the sub-scanning direction is divided into two first and second half sections and the two half sections are then read out through an A/D converter 82 into a FIFO memory 83, and they are selected by a selector 84, combined by an adder 85, and then taken out. The operation of this configuration will be described below.

In FIG. 26, first, time t1 shows a state in which the exposure of the first half section (which is hereinafter referred to as "1a line") of the first line is completed. At this time, within the line sensor 81 are stored signal charges which correspond to the image information of the 1a line. Next, at time t2, the signal charges, which are stored within the line sensor 81 and correspond to the image information of the 1a line, are sequentially transferred by horizontal transfer electrodes and are converted into voltage data at the output part thereof, and are then converted from analog to digital by the A/D converter 82, and are further input into the FIFO memory 83. Then, at time t3, the exposure of the second half section (which is hereinafter referred to as "1b line") of the first line is completed. At this time, within the line sensor 81 are stored signal charges which correspond to the image information of the 1b line.

Next, during period t4, similarly to the above case, the signal charges stored within the line sensor 81 and corresponding to the image information of the 1b line are also transferred sequentially by the horizontal transfer electrodes, converted into voltage data at the output part thereof, then A/D-converted, and finally input into the FIFO memory 83. At this time, the data of the 1a line is transferred to the next stage of the FIFO memory 83. Similarly, after time t5, during period t6, the line data of the front half section (which is hereinafter referred to as "2a line") of the second line are input into the FIFO memory 83. That is, the sequential read-out and storage of the data corresponding to the ½ line are carried out repeatedly in this manner.

When the image signals are taken out, that is, when the line data corresponding to a ½ line sequentially input to the FIFO memory 83 by the above operations are taken out as the data corresponding to one line, the selector selects the line data out of the two line data of the FIFO memory 83 according to a magnification and outputs the selected line data, the output line data are combined by the adder 85 and then output. A cycle at which image signals are taken out as one line data is set two times a cycle to read out ½ line data. In the example shown in FIG. 26, as the line data of G, the sum of the 1a line data and 1b line data is output, while, as the line data of R, the sum of the 1b line data and 2a line data is output.

Therefore, in the respective one line data of G and R read out as the results of the above operations, the one line data of R is shifted in phase in the sub-scanning direction by an amount corresponding to a 0.5 line with respect to the one line data of G. In this manner, by selecting the line data of the respective colors in such a manner that, for example, the first and second half sections of a line or the second half section of the line and the first half section of the next line are combined before they are read out, the phase in the sub-scanning direction can be shifted by an amount corresponding to a 0.5 line for every color signal, with the result that the registration correction of decimal portions can be carried out.

In the present embodiment, the drive cycle of the line sensor is set at ½ of one-line period specified by the horizontal cycle signal. However, this is not limitative but, of course, according to the drive speed capabilities of sensors and the data rates of outputs required, the drive cycle can be set smaller than ½, for example, at ⅓, ¼, ⅕, ⅙, ⅐, ⅛, ⅑, ⅒, . . . In these cases, it is possible to carry out a more accurate registration correction of decimal portions.

Figure 27:
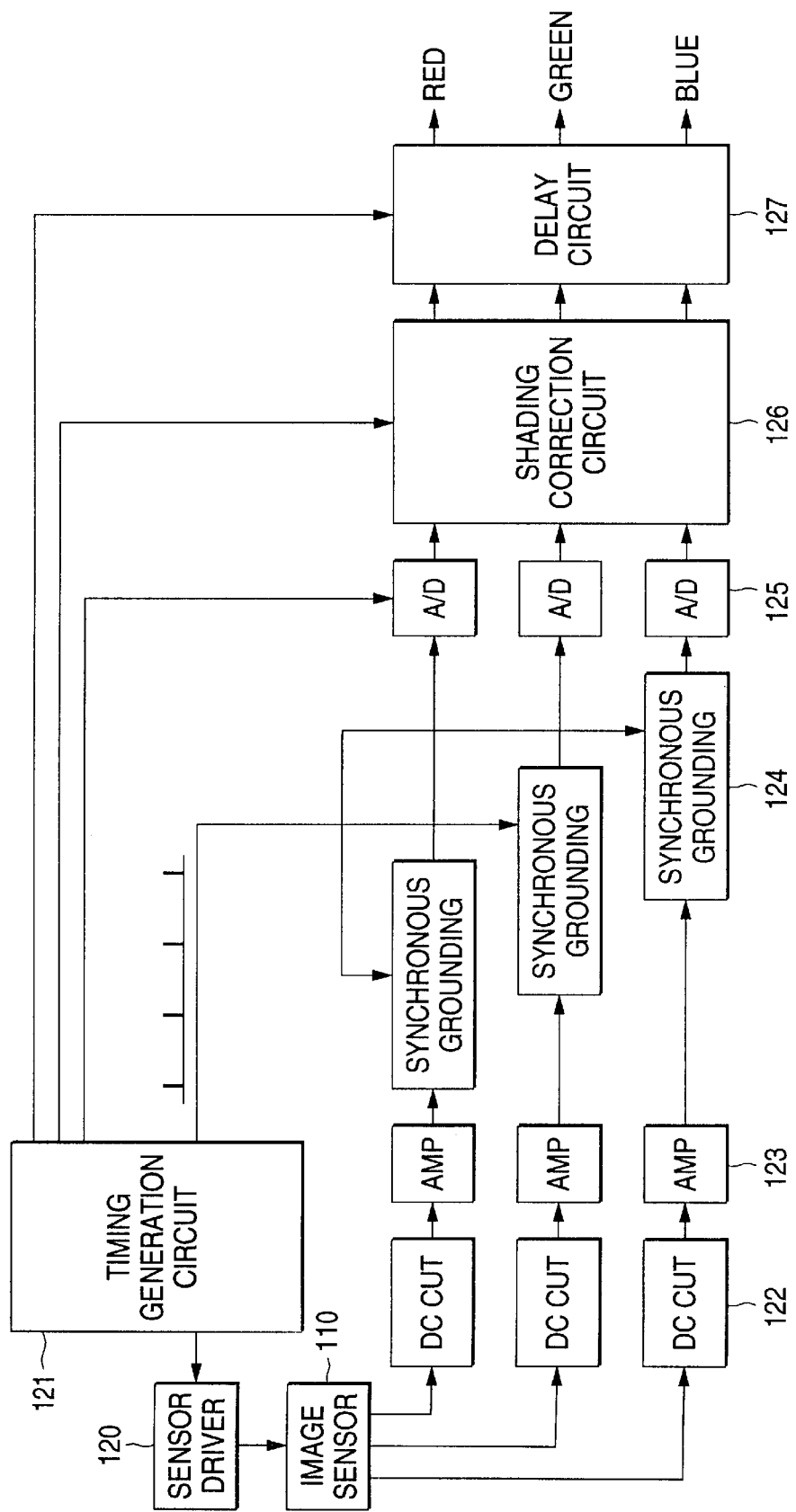
FIG. 27 is a block diagram of the structure of a first embodiment of an image reading device using an image sensor according to the invention.

Next, a description will be given below of an image reading device using the above-mentioned image sensor. FIG. 27 is a block diagram of an embodiment of an image reading device using an image sensor according to the invention, and FIG. 28 is a block diagram of the configuration of a timing generation circuit shown in FIG. 27.

In FIG. 27, an image sensor 110 is driven by a sensor driver 120, while a timing generation circuit 121 supplies a clock pulse and the like to the sensor driver 120. A DC cut circuit 122 is used to cut a DC component in order to cancel variations in temperature and the like from an image signal output from the image sensor 110. And a synchronous grounding circuit 124 performs operations to reproduce a DC component and secure a black level during a dummy pixel portion of the output of the image sensor 110. The dummy pixel period is a period corresponding to a light shielded pixel portion which, after the operation of a shift pulse, is read out before effective pixels are read out. On the assumption that the output of the dummy pixel portion is almost equal to the black read level, the DC reproduction is realized by performing a clamp operation in which the image signal level of the dummy pixel portion is set equal to the ground level. For this purpose, a timing signal representing the dummy pixel portion of the output of the image sensor 110 is supplied from the timing generation circuit 121 to the synchronous grounding circuit 124. An A/D converter 125 is used to convert the image signal into digital image data after it is passed through the synchronous grounding circuit 124, a shading correction circuit 126 is used to perform a given shading correction on the image read signal, and a delay circuit 127 is used to perform a color registration correction on the image sensor 110 of three color lines. Here, when the image signals output from the image sensor 110 are divided into three colors R, G, B and the three colors are respectively divided into two systems consisting of an even pixel system and an odd pixel system, that is, when the image signals are divided into a total of six systems, there is provided in front of the A/D converter 125 a circuit for combining the outputs of the even pixel and odd pixel.

The timing generation circuit 121 is structured such that it selects the supply timings of the shift pulses for specifying the exposure timings of the respective colors according to the sub-scanning read densities for every read color and then supplies the selected supply timings to one exposure period of a horizontal transfer clock to be supplied to the image sensor 110. The configuration of the timing generation circuit 121 is shown in FIG. 28.

Figure 28:
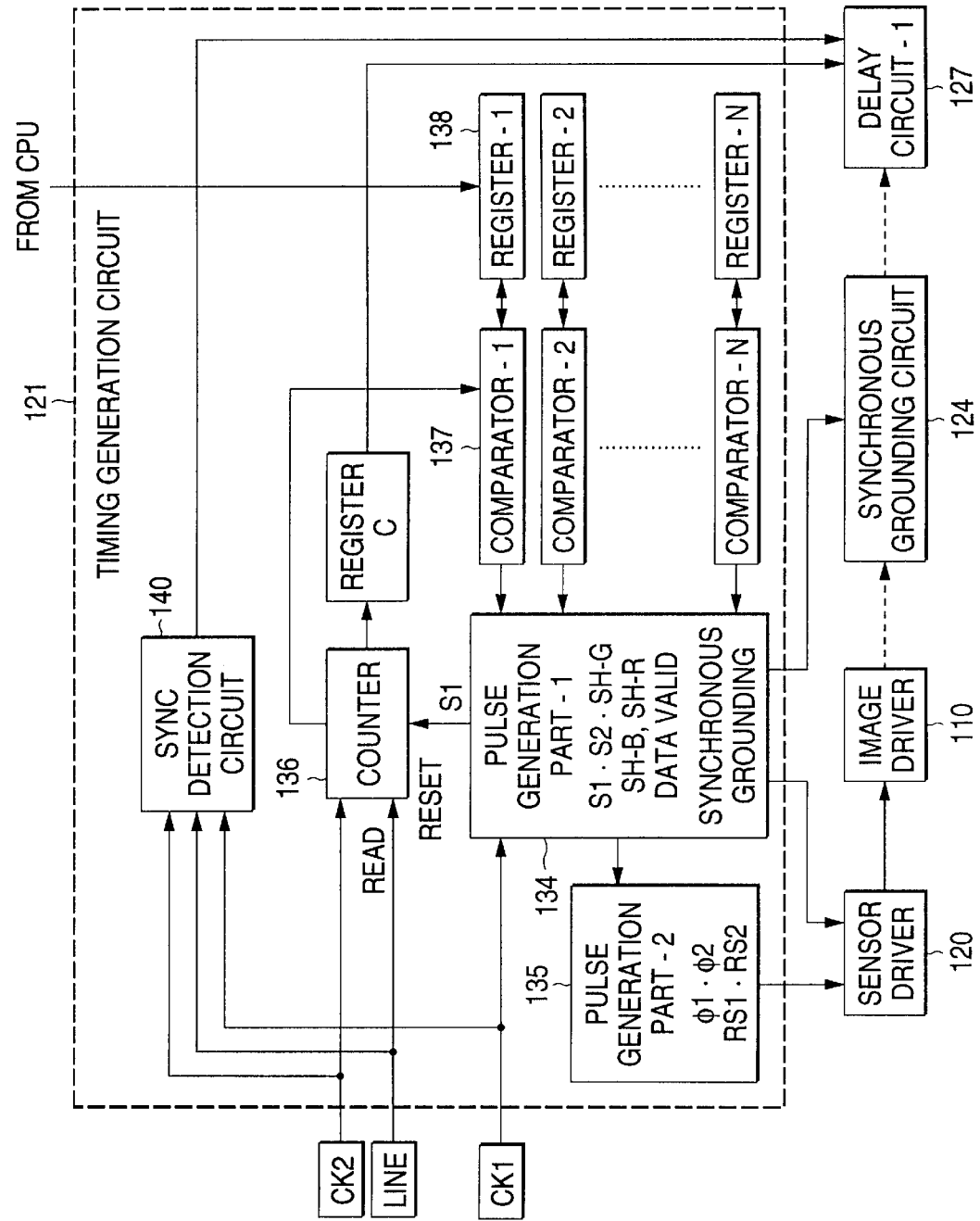
FIG. 28 is a block diagram of the structure of a timing generation circuit.
Figure 29:
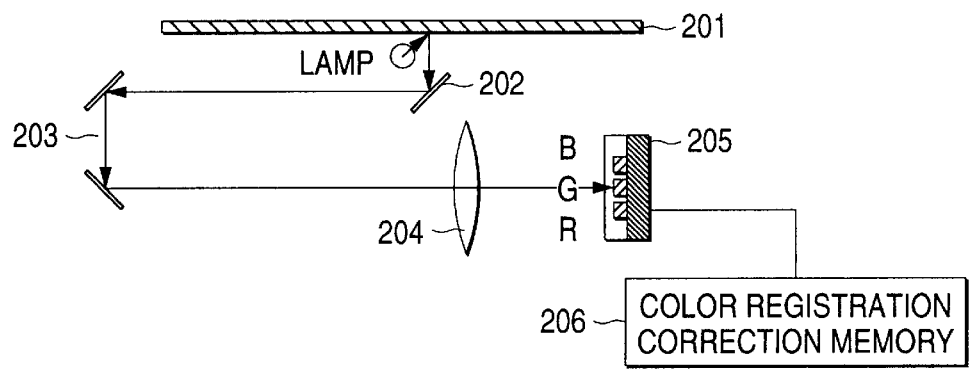
FIG. 29 is a general view of the structure of an image reading device using a 3-line color sensor.
Figure 30:
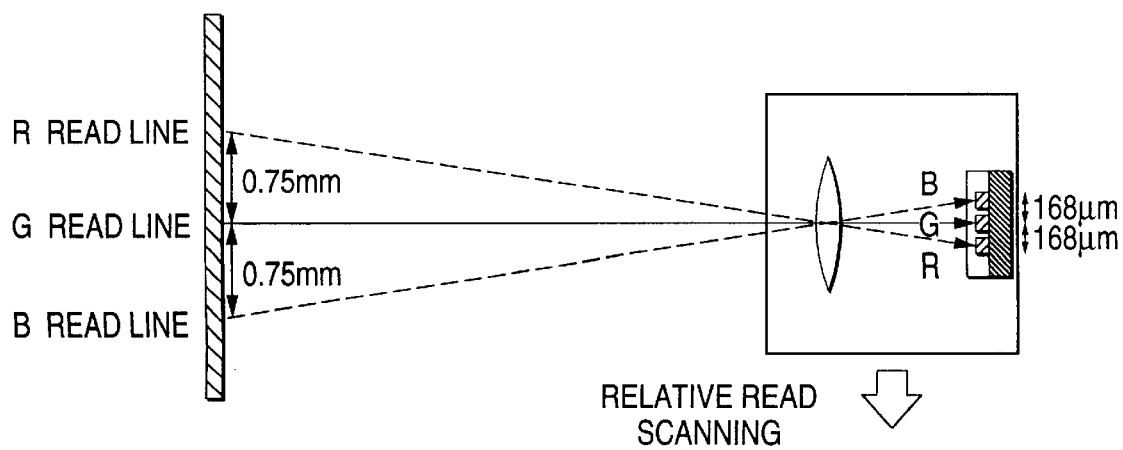
FIG. 30 is an explanatory view of the shifted color registration of the 3-line color sensor in a sub-scanning direction.
Figure 31:
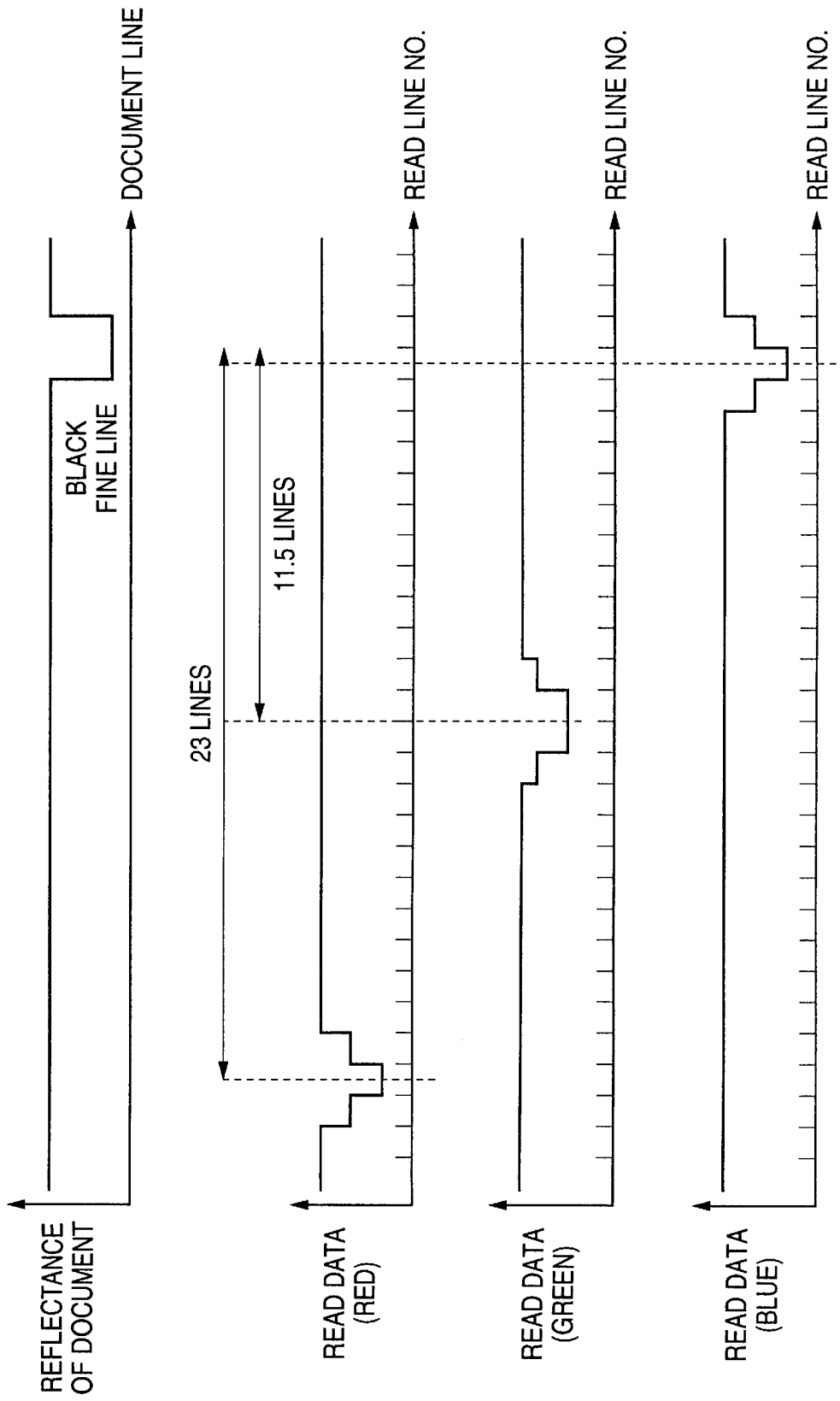
FIG. 31 is an explanatory view of the black fine line read data of the respective color sensors when the amount of delay is not expressed by an integral line.
Figure 32:
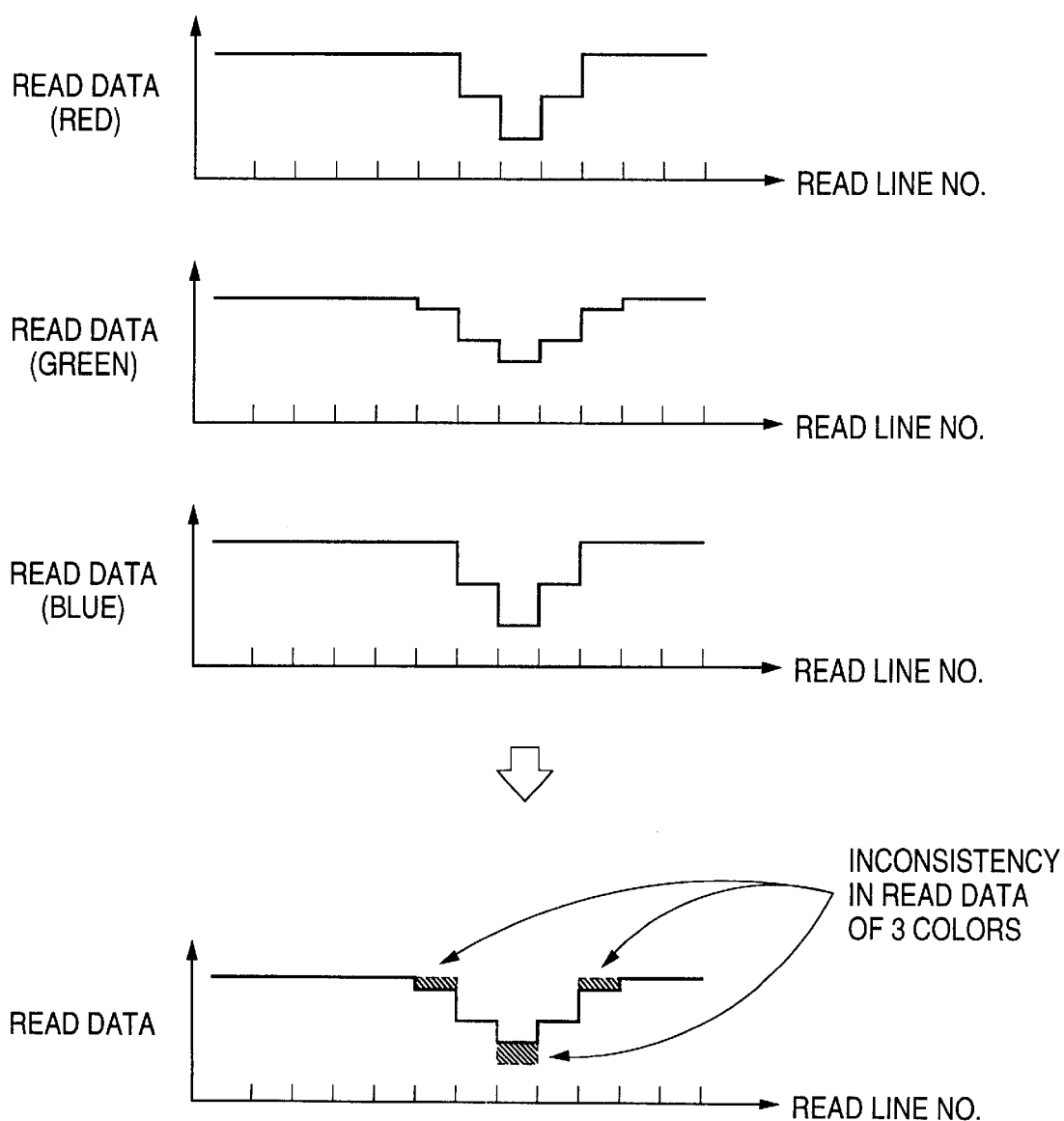
FIG. 32 is an explanatory view of an example in which a read correction is made by delaying and the center of gravity is changed by moving averaging.
Figure 33A:
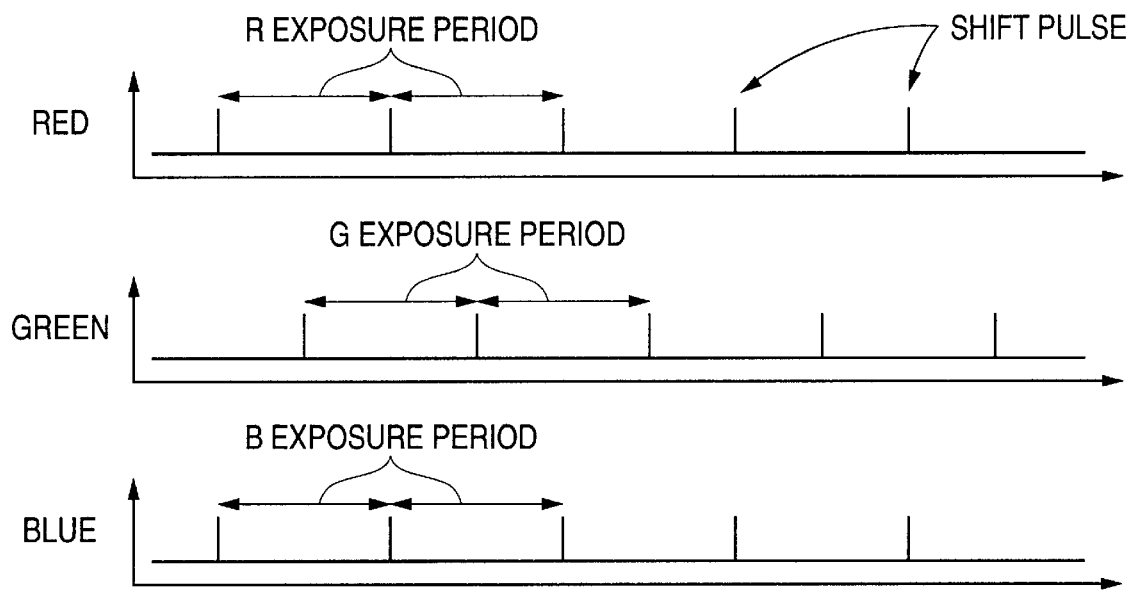
FIGS. 33A and 33B are explanatory views of the input timings of shift pulses into a 3-line color CCD sensor and exposure phase timings variable according to the shift pulse input timings.
Figure 33B:
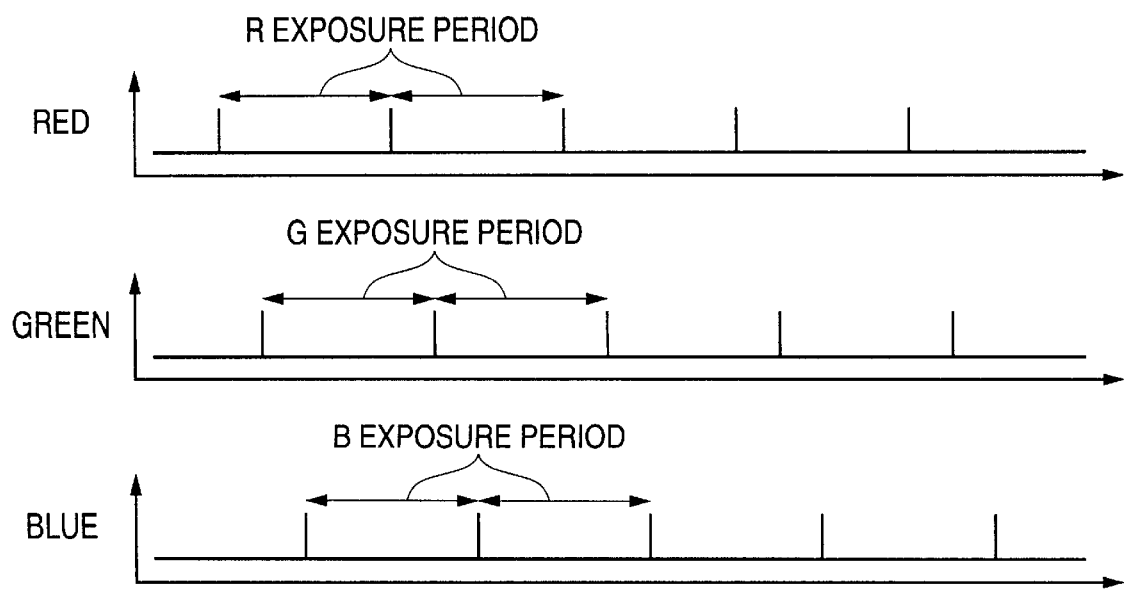
Figure 34:
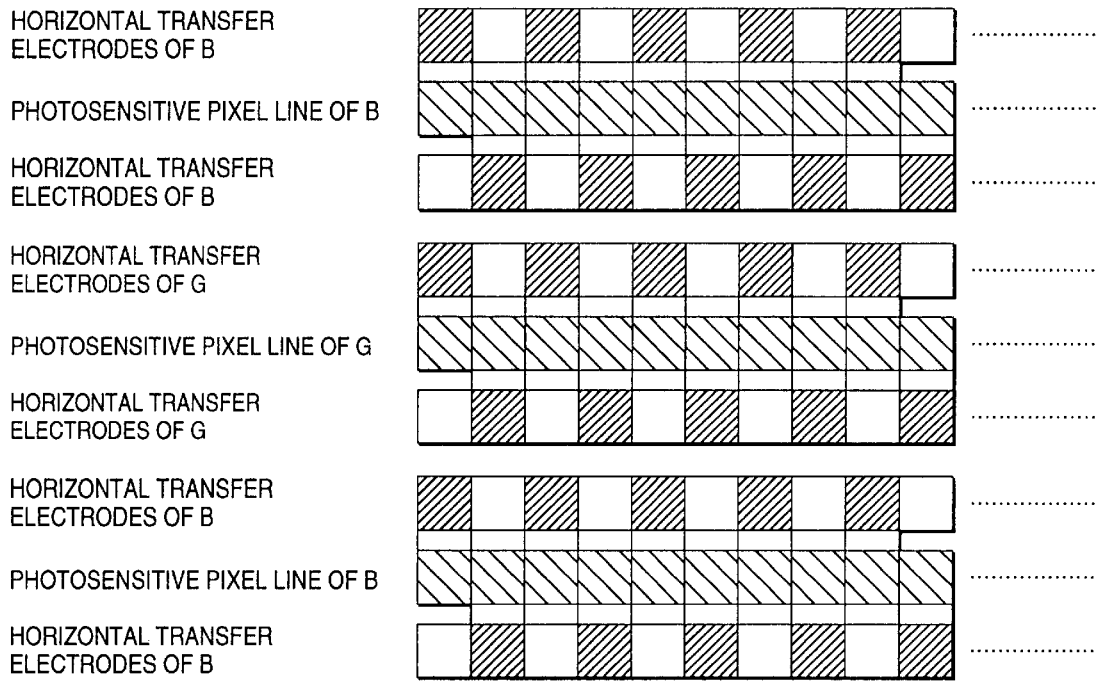
FIG. 34 is an explanatory view of a conventional 3-line color CCD sensor.
Figure 35:
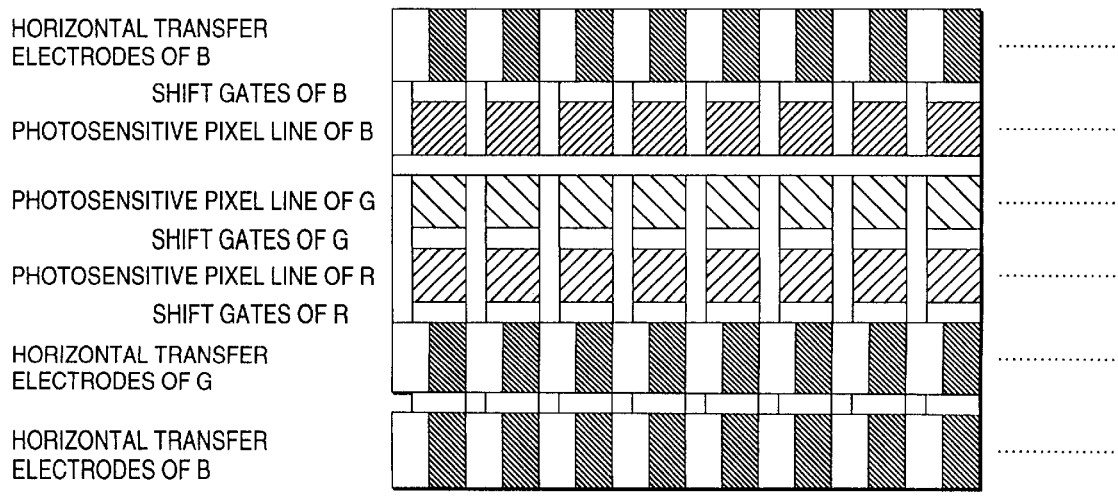
FIG. 35 is an explanatory view of a 3-line color CCD sensor of an in intra-pixel-transfer system.
Figure 36:
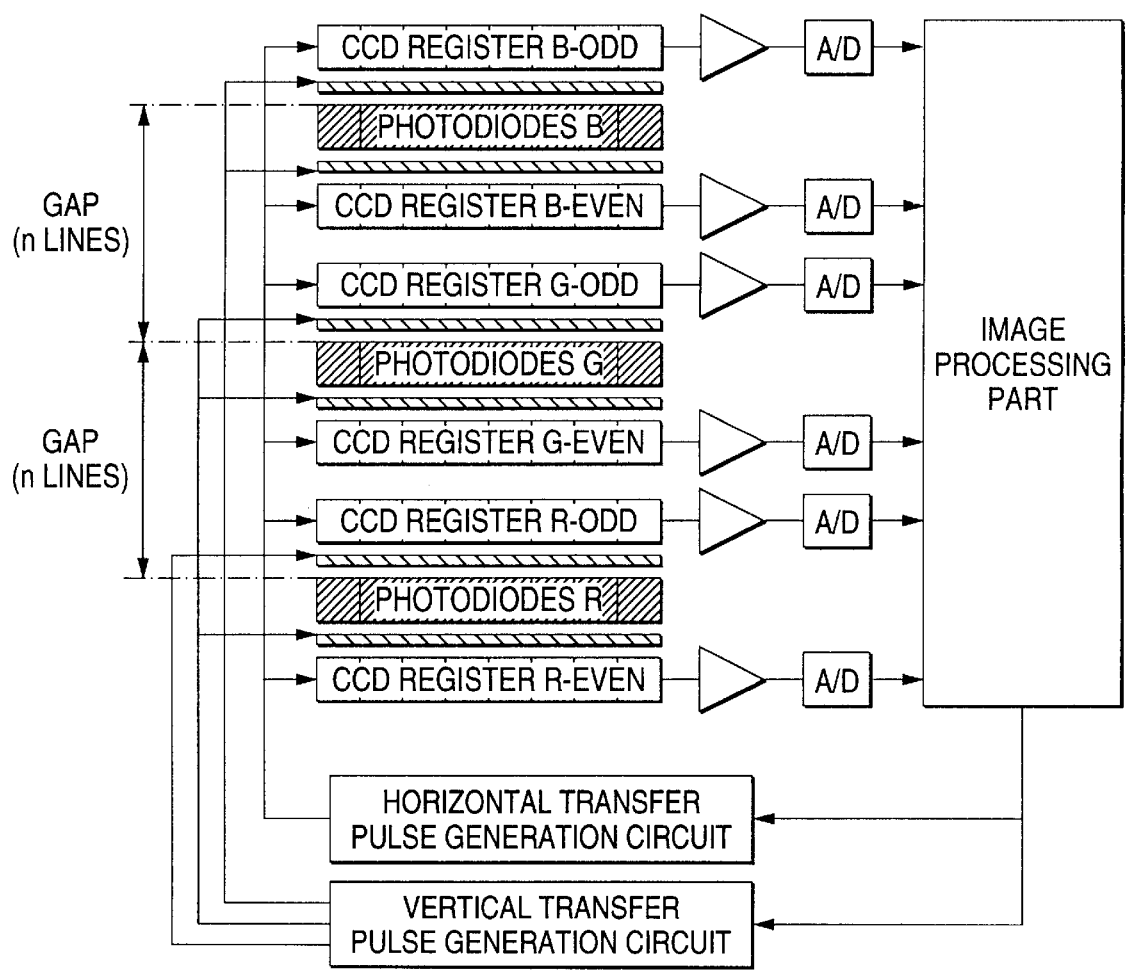
FIG. 36 is a block diagram of a reading device using a conventional 3-line color CCD sensor.
Figure 37:
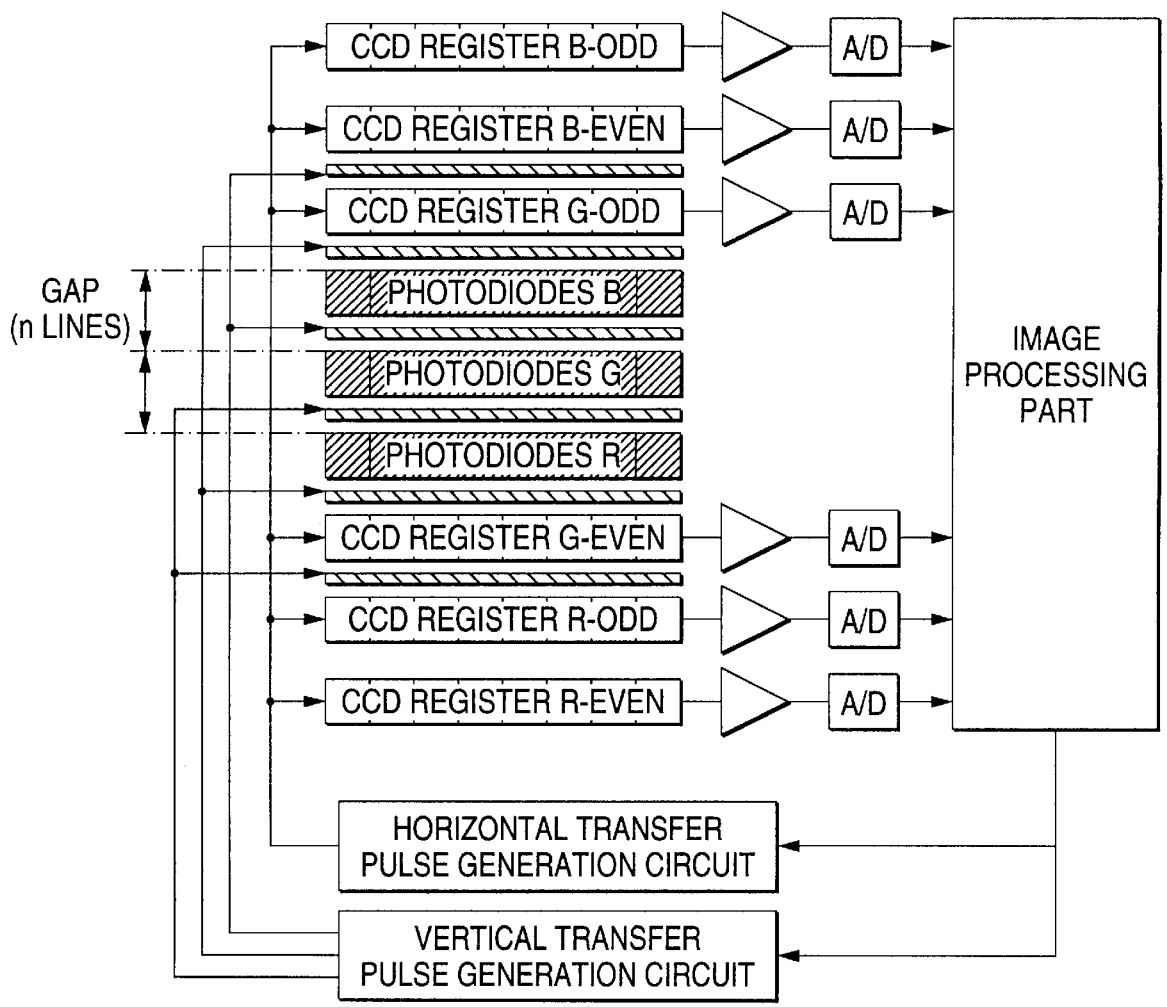
FIG. 37 is a block diagram of a reading device using a 3-line color CCD sensor of an intra-pixel-transfer system.
Figure 38:
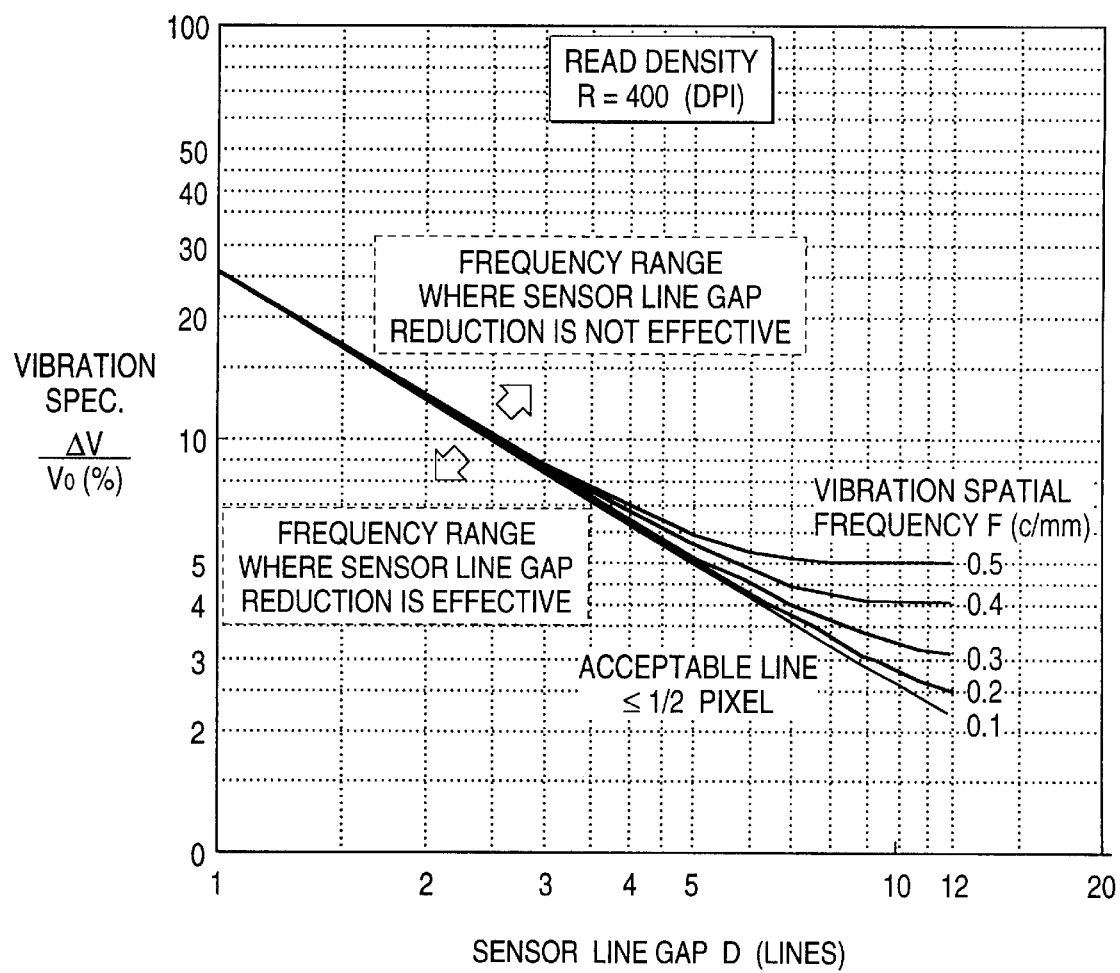
FIG. 38 is a graphical representation of a relationship between a sensor line gap and an allowable speed variation amplitude.

In FIG. 28, a pulse generation part 134 is a part into which a reference clock signal CK1 is input from a given oscillator and also which, in accordance with outputs from a group of comparators 137, generates a signal S1 for determining the stop periods of clock pulses φ1 and φ2, a signal S2 for determining the H/L of the stop periods of the clock pulses φ1 and φ2, shift pulses SH_G, SH_B and SH_R, a data valid signal, and a synchronous grounding signal at given timings, respectively. On the other hand, a pulse generation part 135 is used to generate horizontal transfer clock pulses φ1 and φ2 as well as reset pulses RS1 and RS2 in accordance with the signals that are output from the pulse generation part 134. A counter 136 is used to count a twofold cycle clock CK2 obtained by frequency dividing the reference clock signal CK1 into one half in accordance with a line signal LINE input from outside, and output the count value to the comparators 137. To the comparators 137 are connected registers 138 respectively which are used to set the count values that are compared by the comparators 137. The registers 138 are structured such that signals are input into them from a CPU (not shown) and the set values can be rewritten properly as the need arises. A sync detection circuit 140 is used to detect a sync relationship between the line signal LINE, reference clock CK1 and twofold cycle clock CK2.

Next, a description will be given below of an operation to generate the shift pulses SH_G, SH_B and SH_R, horizontal transfer clock pulses φ1 and φ2, and reset pulses RS1 and RS2 by the above-structured timing generation circuit 121.

First, in the present timing generation circuit, the counter 136 counts the number of pulses of the twofold cycle clock CK2 at the fall timing of the line signal LINE input from outside. Here, the line signal LINE is a signal asynchronous with the reference clock CK1 and, in a digital color copying machine, there is normally used a signal which is synchronous with a timing signal of a polygon scanner of a laser print part. Therefore, due to the fact that the line signal LINE is a signal asynchronous with the twofold cycle clock CK2, the value to be counted by the counter 136 from a certain line signal LINE to a next line signal LINE varies. In view of this, it is necessary to determine a delay pixel by use of the count value. After the line signal LINE falls and the twofold cycle clock CK2 falls, a timing signal S1 is made to fall at a timing when the reference clock CK1 falls for the first time and the twofold cycle clock CK2 is masked by the timing signal S1, thereby providing a signal which can be used to set the stop period in the horizontal transfer clock pulse φ1.

Here, the reason why, for the line signal LINE, the reference of operation of the image sensor is determined in synchronization with the twofold cycle clock CK2 is to prevent the operation of the horizontal transfer clock of one line from being unfinished. That is, if the reference of the operation of the image sensor is synchronized with the reference clock CK1, then even when the horizontal transfer clock φ1 is at H, there is a possibility that the signal S1 for setting the stop period in the horizontal transfer clock φ1 can rise. This in turn raises a possibility that the final pulse width of the horizontal transfer clock φ1 can be reduced to one half. In the normal use of the image sensor, in a period which extends from the falling of the above-mentioned line signal LINE to the falling of the signal S1, the reading out of the image signal has been completed. Therefore, the occurrence of the horizontal transfer clock having such a half width has no influence on the normal use of the image sensor. However, in the use of the present embodiment of the invention, since there is a possibility that an operation to read out the signals of R and the like can be continued even during the above period, the occurrence of the horizontal transfer clock having such a half width has an influence on the read image data. This is the reason why the signal S1 for setting the stop period in the horizontal transfer clock φ1 is set in such a manner that it is synchronous with the twofold cycle clock CK2.

As can be seen clearly from the foregoing description, according to the invention, in an image sensor of an intra-pixel-line transfer system which can realize an image sensor having a narrow line gap, since an intermediate register capable of transferring signal charges bi-directionally in the vertical direction is used as temporary saving and storage means for saving and storing the signal charges thereinto, the exposure phase timing control can be realized, which makes it possible to solve at the same time the two problems that have been left unsolved in the conventional 3-line sensor: one of them is a color registration correction to be made when the read scanning density in the sub-scanning direction is changed for reading of an arbitrary magnification; and the other is a color registration correction error occurring due to variations in the read scanning speed (that is, the prior art is unable to provide an effect which can be obtained by reducing the line gap by use of the intra-pixel-line transfer system).

Therefore, since there can be obtained an excellent color registration correction performance in an arbitrary scanning density, it is possible to supply a color image reading device which can provide an excellent black character reproduction. That is, in a digital copying machine or the like which is used to read a color document, when a copying magnification is changed, a black fine line document in three colors combined one on top of another can be reproduced sharply with no color shifted in any reduction/enlargement magnifications, so that the image quality can be improved to a great extent.

Further, due to the fact that it is possible to achieve a color registration correction of an arbitrary amount including decimal portions, in an image sensor of a intra-pixel transfer system, there is eliminated a restriction that the line gap of the image sensor must be an integer multiple of a pixel pitch, so that the line gap can be set less than 2 lines.

What is claimed is:

1. An image sensor comprising:
    a photosensitive pixel part including a plurality of photosensitive pixel lines adjacent to each other in a sub-scanning direction, each of said photosensitive pixel lines having a number of photosensitive pixels arranged in a main scanning direction;
    a horizontal transfer register disposed outside of said photosensitive pixel part and connected to external output lines, for transferring signal charges of said photosensitive pixel lines in the main scanning direction;
    storage means interposed between said photosensitive pixel lines and said horizontal transfer register, for saving therein signal charges on a pixel-by-pixel basis, wherein said storage means includes a semiconductor having an impurity density or a thickness that is so set that a potential of said semiconductor is on a negative side of potentials of said adjoining photosensitive pixel line and said horizontal transfer register when given potentials are applied to said shift gates; and
    shift gates for controlling transfer of signal charges between said photosensitive pixel lines, said storage means, and said horizontal transfer register,
    wherein at a time point when exposure of an inside photosensitive pixel line not adjoining said storage means has been finished, signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register by controlling potentials of said photosensitive pixel lines, said storage means, said horizontal transfer register, and said shift gates as well as switching timing of the potentials.

2. The image sensor as set forth in claim 1, wherein said storage means and said shift gates are so constructed as to be able to transfer a signal charge in the main scanning direction.

3. The image sensor as set forth in claim 1, wherein said storage means and said shift gates are so constructed as to be able to transfer a signal charge bi-directionally in a vertical transfer direction.

4. The image sensor as set forth in claim 1, wherein said horizontal transfer register includes plural lines of divisional horizontal transfer registers for outputting signal charges in accordance with a pitch of said photosensitive pixels of said photosensitive pixel lines.

5. The image sensor as set forth in claim 1, wherein said storage means includes plurality lines of storage means arranged in a vertical transfer direction.

6. The image sensor as set forth in claim 1, wherein said horizontal transfer register includes plural lines of horizontal transfer registers, and said storage means is interposed between said plural lines of horizontal transfer registers.

7. An image reading device comprising:
    an image sensor comprising:
        a photosensitive pixel part including a plurality of photosensitive pixel lines adjacent to each other in a sub-scanning direction, each of said photosensitive pixel lines having a number of photosensitive pixels arranged in a main scanning direction;
        a horizontal transfer register disposed outside of said photosensitive pixel part and connected to external output lines, for transferring signal charges of said photosensitive pixel lines in the main scanning direction;
        storage means interposed between said photosensitive pixel lines and said horizontal transfer register, for saving therein signal charges on a pixel-by-pixel basis; and
        shift gates for controlling transfer of signal charges between said photosensitive pixel lines, said storage means, and said horizontal transfer register; and
    control means for controlling potentials of said photosensitive pixel lines, said storage means, said horizontal transfer register, and said shift gates as well as switching timing of the potentials so that signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register at a time point when exposure of an inside photosensitive pixel line not adjoining said storage means has been finished,
    whereby said image reading device reads an image based on the signal charges received from said horizontal transfer register, and
    wherein said storage means is so constructed as to be able to transfer signal charges in both vertical and horizontal transfer directions, and wherein said control means selectively operates said shift gates so that after the signal charges of said inside photosensitive pixel line are transferred to said storage means and said horizontal transfer register, the signal charges of said outside photosensitive pixel line are returned to photosensitive pixels where the signal charges existed before being saved.

8. The image reading device as set forth in claim 7, wherein said control means determines exposure start timing and exposure end timing of said respective photosensitive pixel lines in accordance with a reduction/enlargement magnification of image reading.

9. An image reading device comprising:
    an image sensor comprising:
        a photosensitive pixel part including a plurality of photosensitive pixel lines adjacent to each other in a sub-scanning direction, each of said photosensitive pixel lines having a number of photosensitive pixels arranged in a main scanning direction;
        a horizontal transfer register disposed outside of said photosensitive pixel part and connected to external output lines, for transferring signal charges of said photosensitive pixel lines in the main scanning direction;

storage means interposed between said photosensitive pixel lines and said horizontal transfer register, for saving therein signal charges on a pixel-by-pixel basis; and shift gates for controlling transfer of signal charges between said photosensitive pixel lines, said storage means, and said horizontal transfer register; and control means for controlling potentials of said photosensitive pixel lines, said storage means, said horizontal transfer register, and said shift gates as well as switching timing of the potentials so that signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register at a time point when exposure of an inside photosensitive pixel line not adjoining said storage means has been finished, whereby said image reading device reads an image based on the signal charges received from said horizontal transfer register, and wherein said control means selectively operates said shift gates so that after the signal charges of said inside photosensitive pixel line are transferred to said storage means and said horizontal transfer register, the signal charges of said outside photosensitive pixel line being saved in said storage means are added to signal charges accumulated in corresponding photosensitive pixels of said outside photosensitive pixel line after saving of the signal charges.

10. An image reading device comprising:

an image sensor comprising:

a photosensitive pixel part including a plurality of photosensitive pixel lines adjacent to each other in a sub-scanning direction, each of said photosensitive pixel lines having a number of photosensitive pixels arranged in a main scanning direction;

a horizontal transfer register disposed outside of said photosensitive pixel part and connected to external output lines, for transferring signal charges of said photosensitive pixel lines in the main scanning direction;

storage means interposed between said photosensitive pixel lines and said horizontal transfer register, for saving therein signal charges on a pixel-by-pixel basis; and shift gates for controlling transfer of signal charges between said photosensitive pixel lines, said storage means, and said horizontal transfer register; and control means for controlling potentials of said photosensitive pixel lines, said storage means, said horizontal transfer register, and said shift gates as well as switching timing of the potentials so that signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register at a time point when exposure of an inside photosensitive pixel line not adjoining said storage means has been finished, whereby said image reading device reads an image based on the signal charges received from said horizontal transfer register, and wherein said horizontal transfer register includes plural lines of divisional horizontal transfer registers for outputting signal charges in accordance with a pitch of said photosensitive pixels of said photosensitive pixel lines, and wherein said control means selectively operates said shift gates so that after the signal charges of the photosensitive pixels of the outside photosensitive pixel line are saved into said storage means, the signal charges of said inside photosensitive pixel line are transferred to different locations of said storage means from locations where the signal charges of said outside photosensitive pixel line are saved or to said divisional horizontal transfer registers.

11. An image reading device comprising:

an image sensor comprising:

a photosensitive pixel part including a plurality of photosensitive pixel lines adjacent to each other in a sub-scanning direction, each of said photosensitive pixel lines having a number of photosensitive pixels arranged in a main scanning direction;

a horizontal transfer register disposed outside of said photosensitive pixel part and connected to external output lines, for transferring signal charges of said photosensitive pixel lines in the main scanning direction;

storage means interposed between said photosensitive pixel lines and said horizontal transfer register, for saving therein signal charges on a pixel-by-pixel basis; and shift gates for controlling transfer of signal charges between said photosensitive pixel lines, said storage means, and said horizontal transfer register; and control means for controlling potentials of said photosensitive pixel lines, said storage means, said horizontal transfer register, and said shift gates as well as switching timing of the potentials so that signal charges of an outside photosensitive pixel line adjoining said storage means and under exposure are saved into said storage means, and then signal charges of said inside photosensitive pixel line are transferred through said outside photosensitive pixel line to said storage means and said horizontal transfer register at a time point when exposure of an inside photosensitive pixel line not adjoining said storage means has been finished, whereby said image reading device reads an image based on the signal charges received from said horizontal transfer register, and wherein said storage means includes plural lines of storage means arranged in a vertical transfer direction, and forms two systems of vertical transfer passages, and wherein said control means selectively operates said shift gates so that after the signal charges of said outside photosensitive pixel line are saved into said storage means of one of said two systems of vertical transfer passages, the signal charges of said inside photosensitive pixel line are transferred to said storage means of the other system.

* * * * *